(12) United States Patent
Lee et al.

(10) Patent No.: US 12,402,128 B2
(45) Date of Patent: Aug. 26, 2025

(54) METHOD OF TRANSMITTING AND RECEIVING DOWNLINK CONTROL CHANNEL AND APPARATUS THEREFOR

(71) Applicant: LG Electronics Inc., Seoul (KR)

(72) Inventors: Sunghoon Lee, Seoul (KR); Jaehyung Kim, Seoul (KR); Seonwook Kim, Seoul (KR); Youngdae Lee, Seoul (KR); Suckchel Yang, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 432 days.

(21) Appl. No.: 18/146,182

(22) Filed: Dec. 23, 2022

(65) Prior Publication Data

US 2023/0354329 A1 Nov. 2, 2023

(30) Foreign Application Priority Data

Apr. 28, 2022 (KR) .................. 10-2022-0053036

(51) Int. Cl.
*H04W 72/1273* (2023.01)
*H04W 56/00* (2009.01)

(52) U.S. Cl.
CPC ..... *H04W 72/1273* (2013.01); *H04W 56/001* (2013.01)

(58) Field of Classification Search
CPC ........... H04W 72/1273; H04W 56/001; H04W 72/231; H04W 74/0833; H04W 4/70; H04L 5/0007; H04L 5/0048; H04L 5/0094; H04L 5/0053; H04L 5/0044; H04L 1/0013; H04L 27/2602
See application file for complete search history.

(56) References Cited

U.S. PATENT DOCUMENTS

2021/0409983 A1* 12/2021 Taherzadeh Boroujeni ................ H04W 72/23
2023/0353301 A1* 11/2023 Takeda .................. H04L 5/0051

* cited by examiner

*Primary Examiner* — Kyaw Z Soe
(74) *Attorney, Agent, or Firm* — Fish & Richardson P.C.

(57) ABSTRACT

A method of receiving a physical downlink control channel (PDCCH) by a user equipment (UE) in a wireless communication system is provided. The method includes receiving, through a higher layer, (i) first information including a plurality of identifications (IDs) for a plurality of control resource sets (CORESETs) and (ii) second information related to resources of the plurality of CORESETs, determining an upper CORESET including the plurality of CORESETs based on the first information and the second information, and receiving the PDCCH through the upper CORESET. Each of the plurality of CORESETs is configured based on (i) a control channel element (CCE) supporting an aggregation level of 2n and (ii) N orthogonal frequency division multiplexing (OFDM) symbols, each of n and N being a positive integer and N being equal to or less than 3.

13 Claims, 16 Drawing Sheets

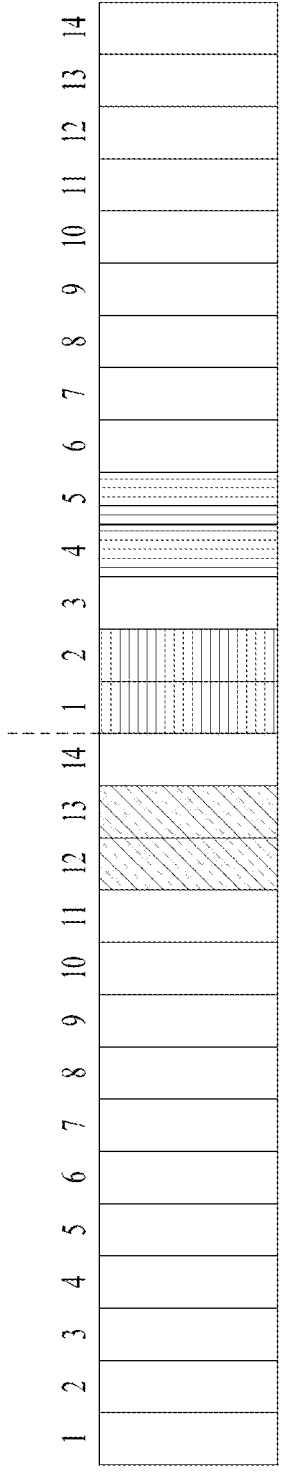
FIG. 13A
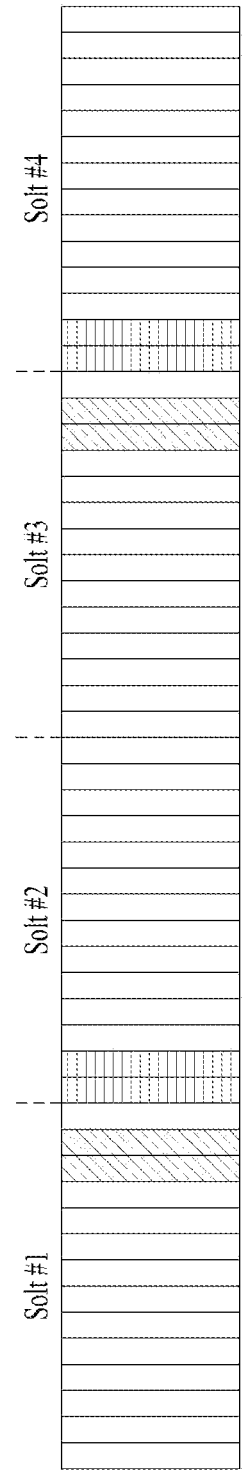
FIG. 13B
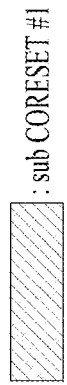 : sub CORESET #1
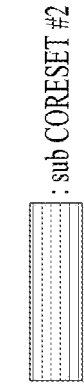 : sub CORESET #2
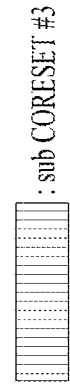 : sub CORESET #3

METHOD OF TRANSMITTING AND RECEIVING DOWNLINK CONTROL CHANNEL AND APPARATUS THEREFOR

CROSS-REFERENCE TO RELATED APPLICATIONS

This application claims the benefit of an earlier filing date and right of priority to Korean Patent Application No. 10-2022-0053036, filed on Apr. 28, 2022, which is hereby incorporated by reference as if fully set forth herein.

TECHNICAL FIELD

The present disclosure relates to a method of transmitting and receiving a downlink control channel and an apparatus therefor and, more particularly, to a method of configuring a control resource set (CORESET) for a reduced capacity (RedCap) user equipment (UE) and transmitting and receiving a physical downlink control channel (PDCCH) through the CORESET and an apparatus therefor.

BACKGROUND

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

SUMMARY

An object of the present disclosure is to provide a method of transmitting and receiving a downlink control channel and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

To achieve these objects and other advantages and in accordance with the purpose of the disclosure, as embodied and broadly described herein, a method of receiving a physical downlink control channel (PDCCH) by a user equipment (UE) in a wireless communication system includes receiving, through a higher layer, (i) first information including a plurality of identifications (IDs) for a plurality of control resource sets (CORESETs) and (ii) second information related to resources of the plurality of CORESETs, determining an upper CORESET including the plurality of CORESETs based on the first information and the second information, and receiving the PDCCH through the upper CORESET. Each of the plurality of CORESETs may be configured based on (i) a control channel element (CCE) supporting an aggregation level of 2n and (ii) N orthogonal frequency division multiplexing (OFDM) symbols, each of n and N being a positive integer and N being equal to or less than 3.

A time gap including at least one OFDM symbol may be present between the plurality of CORESETs.

A maximum bandwidth available by the UE may include resource blocks (RBs) equal to or less than a predetermined number.

The plurality of CORESETs may be not mapped to invalid OFDM symbols, and the invalid OFDM symbols may be used for a downlink signal other than the PDCCH.

The downlink signal may be a synchronization signal block (SSB) or a common reference signal (CRS).

The number of OFDM symbols allocated for the upper CORESET may exceed 3.

In another aspect of the present disclosure, a user equipment (UE) for receiving a physical downlink control channel (PDCCH) in a wireless communication system includes at least one transceiver, at least one processor, and at least one memory operably connected to the at least one processor and configured to store instructions causing, when executed, the at least one processor to perform operations. The operations may include receiving, through a higher layer, (i) first information including a plurality of identifications (IDs) for a plurality of control resource sets (CORESETs) and (ii) second information related to resources of the plurality of CORESETs, through the at least one transceiver, determining an upper CORESET including the plurality of CORESETs based on the first information and the second information, and receiving the PDCCH through the upper CORESET through the at least one transceiver. Each of the plurality of CORESETs may be configured based on (i) a control channel element (CCE) supporting an aggregation level of $2^n$ and (ii) N orthogonal frequency division multiplexing (OFDM) symbols, each of n and N being a positive integer and N being equal to or less than 3.

A time gap including at least one OFDM symbol may be present between the plural CORESETs.

A maximum bandwidth usable by the UE may include resource blocks (RBs) equal to or less than a predetermined number.

The plurality of CORESETs may be not to invalid OFDM symbols, and the invalid OFDM symbols may be used for a downlink signal other than the PDCCH.

The downlink signal may be a synchronization signal block (SSB) or a common reference signal (CRS).

The number of OFDM symbols allocated for the upper CORESET may exceed 3.

In another aspect of the present disclosure, an apparatus for receiving a physical downlink control channel (PDCCH) in a wireless communication system include at least one processor, and at least one memory operably connected to the at least one processor and configured to store instructions causing, when executed, the at least one processor to perform operations. The operations may include receiving, through a higher layer, (i) first information including a plurality of identifications (IDs) for a plurality of control resource sets (CORESETs) and (ii) second information related to resources of the plurality of CORESETs, determining an upper CORESET including the plurality of CORESETs based on the first information and the second information, and receiving the PDCCH through the upper CORESET through. Each of the plurality of CORESETs may be configured based on (i) a control channel element (CCE) supporting an aggregation level of 2n and (ii) N orthogonal frequency division multiplexing (OFDM) symbols, each of n and N being a positive integer and N being equal to or less than 3.

In another aspect of the present disclosure, a computer-readable storage medium including at least one computer program that causes at least one processor to perform operations is provided. The operations may include receiving, through a higher layer, (i) first information including a plurality of identifications (IDs) for a plurality of control resource sets (CORESETs) and (ii) second information related to resources of the plurality of CORESETs, determining an upper CORESET including the plurality of CORESETs based on the first information and the second information, and receiving the PDCCH through the upper CORESET. Each of the plurality of CORESETs may be configured based on (i) a control channel element (CCE) supporting an aggregation level of 2n and (ii) N orthogonal frequency division multiplexing (OFDM) symbols, each of n and N being a positive integer and N being equal to or less than 3.

In another aspect of the present disclosure, a method of transmitting a physical downlink control channel (PDCCH) by a base station (BS) in a wireless communication system includes transmitting, through a higher layer, (i) first information including a plurality of identifications (IDs) for a plurality of control resource sets (CORESETs) and (ii) second information related to resources of the plurality of CORESETs, and transmitting the PDCCH through an upper CORESET based on the first information and the second information. The upper CORESET may include the plurality of CORESETs. Each of the plural CORESETs may be configured based on (i) a control channel element (CCE) supporting an aggregation level of 2n and (ii) N orthogonal frequency division multiplexing (OFDM) symbols, each of n and N being a positive integer and N being equal to or less than 3.

In another aspect of the present disclosure, a base station (BS) for transmitting a physical downlink control channel (PDCCH) in a wireless communication system include at least one transceiver, at least one processor, and at least one memory operably connected to the at least one processor and configured to store instructions causing, when executed, the at least one processor to perform operations, The operations may include transmitting, through a higher layer, (i) first information including a plurality of identifications (IDs) for a plurality of control resource sets (CORESETs) and (ii) second information related to resources of the plurality of CORESETs, and transmitting the PDCCH through an upper CORESET based on the first information and the second information through the at least one transceiver. The upper CORESET may include the plurality of CORESETs. Each of the plurality of CORESETs may be configured based on (i) a control channel element (CCE) supporting an aggregation level of 2n and (ii) N orthogonal frequency division multiplexing (OFDM) symbols, each of n and N being a positive integer and N being equal to or less than 3.

According to the present disclosure, a control channel for a UE with a reduced bandwidth may be efficiently configured. Further, according to the present disclosure, the capability of a UE with degraded coverage may be preserved.

It will be appreciated by persons skilled in the art that the effects that could be achieved with the present disclosure are not limited to what has been particularly described hereinabove and other advantages of the present disclosure will be more clearly understood from the following detailed description.

BRIEF DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 12, 13A, and 13B are diagrams illustrating allocation of a control resource set (CORESET) according to an embodiment of the present disclosure;

DETAILED DESCRIPTION

Figure 1:
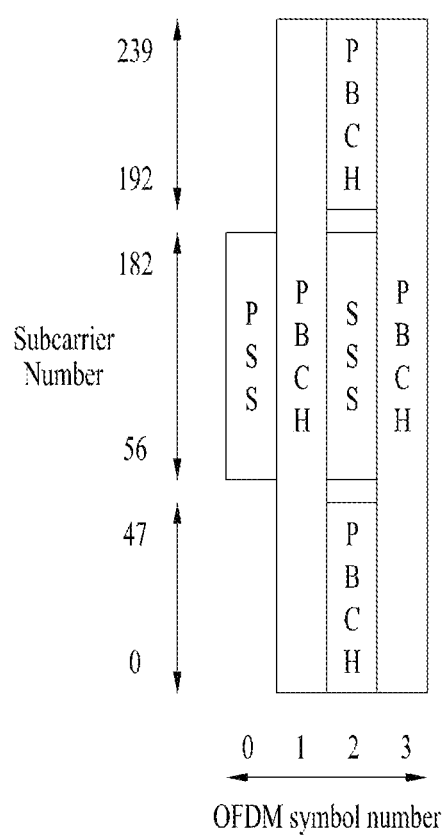
FIG. 1 illustrates the construction of an SS/PBCH block.

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

While the following description is given in the context of a 3GPP communication system (e.g., NR) for clarity, the technical spirit of the present disclosure is not limited to the 3GPP communication system. For the background art, terms, and abbreviations used in the present disclosure, refer to the technical specifications published before the present disclosure (e.g., 38.211, 38.212, 38.213, 38.214, 38.300, 38.331, and so on).

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup may be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

FIG. 1 illustrates a synchronization signal block (SSB) structure. The UE may perform cell search, system information acquisition, beam alignment for initial access, DL measurement, and so on based on an SSB. The term SSB is used interchangeably with synchronization signal/physical broadcast channel (SS/PBCH) block.

Referring to FIG. 1, an SSB is composed of a PSS, an SSS, and a PBCH. The SSB includes four consecutive OFDM symbols. The PSS, the PBCH, the SSS/PBCH, and the PBCH are transmitted on the respective OFDM symbols. Each of the PSS and the SSS includes one OFDM symbol and 127 subcarriers, and the PBCH includes 3 OFDM symbols and 576 subcarriers. Polar coding and quadrature phase shift keying (QPSK) are applied to the PBCH. The PBCH includes data REs and demodulation reference signal (DMRS) REs in each OFDM symbol. There are three DMRS REs per RB, with three data REs between every two adjacent DMRS REs.

Cell Search

The cell search refers to a procedure in which the UE obtains time/frequency synchronization of a cell and detects a cell ID (e.g., physical layer cell ID (PCID)) of the cell. The PSS may be used in detecting a cell ID within a cell ID group, and the SSS may be used in detecting a cell ID group. The PBCH may be used in detecting an SSB (time) index and a half-frame.

The cell search procedure of the UE may be summarized as described in Table 1 below.

TABLE 1

| | Type of Signals | Operations |
|---|---|---|
| 1st step | PSS | SS/PBCH block (SSB) symbol timing acquisition<br>Cell ID detection within a cell ID group (3 hypothesis) |
| 2nd Step | SSS | Cell ID group detection (336 hypothesis) |
| 3rd Step | PBCH DMRS | SSB index and Half frame (HF) index (Slot and frame boundary detection) |
| 4th Step | PBCH | Time information (80 ms, System Frame Number (SFN), SSB index, HF)<br>Remaining Minimum System Information (RMSI) Control resource set (CORESET)/Search space configuration |
| 5th Step | PDCCH and PDSCH | Cell access information<br>RACH configuration |

System Information Acquisition

Figure 2:
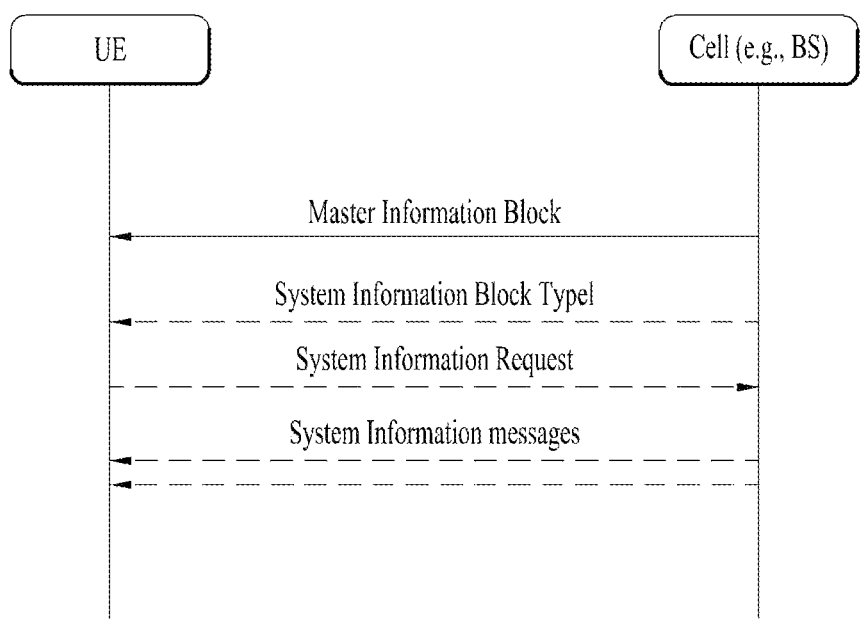
FIG. 2 illustrates a method of transmitting and receiving system information.

FIG. 2 illustrates a system information (SI) acquisition procedure. The UE may obtain access stratum (AS)-/non-access stratum (NAS)-information in the SI acquisition procedure. The SI acquisition procedure may be applied to UEs in RRC_IDLE, RRC_INACTIVE, and RRC_CONNECTED states.

SI is divided into a master information block (MIB) and a plurality of system information blocks (SIBs). The MIB and the plurality of SIBs are further divided into minimum SI and other SI. The minimum SI may include the MIB and systemInformationBlock1 (SIB1), carrying basic information required for initial access and information required to obtain the other SI. SIB1 may also be referred to as remaining minimum system information (RMSI). For details, the following may be referred to.

The MIB includes information/parameters related to reception of SIB1 and is transmitted on the PBCH of an SSB. The UE assumes that a half-frame including an SSB is repeated every 20 ms during initial cell selection. The UE may determine from the MIB whether there is any control resource set (CORESET) for a Type0-PDCCH common search space. The Type0-PDCCH common search space is a kind of PDCCH search space and used to transmit a PDCCH that schedules an SI message. In the presence of a Type0-PDCCH common search space, the UE may determine (1) a plurality of contiguous RBs and one or more consecutive symbols included in a CORESET, and (ii) a PDCCH occasion (e.g., a time-domain position at which a PDCCH is to be received), based on information (e.g., pdcch-ConfigSIB1) included in the MIB. In the absence of a Type0-PDCCH common search space, pdcch-ConfigSIB1 provides information about a frequency position at which the SSB/SIB1 exists and information about a frequency range without any SSB/SIB1.

SIB1 includes information related to availability and scheduling (e.g., a transmission periodicity and an SI-window size) of the remaining SIBs (hereinafter, referred to as SIBx where x is an integer equal to or larger than 2). For example, SIB1 may indicate whether SIBx is broadcast periodically or in an on-demand manner upon UE request. If SIBx is provided in the on-demand manner, SIB1 may include information required for the UE to transmit an SI request. A PDCCH that schedules SIB1 is transmitted in the Type0-PDCCH common search space, and SIB1 is transmitted on a PDSCH indicated by the PDCCH.

SIBx is included in an SI message and transmitted on a PDSCH. Each SI message is transmitted within a periodic time window (i.e., SI-window).

Random Access Channel (RACH) Procedure

When a UE first accesses a BS or has no radio resource for signal transmission, the UE may perform a RACH procedure to the BS.

The RACH procedure may be used for various purposes. For example, the RACH procedure may be used for initial network access from RRC_IDLE, an RRC connection re-establishment procedure, handover, UE-triggered UL data transmission, transition from RRC_INACTIVE, time alignment establishment in SCell addition, other system information (OSI) request and beam failure recovery, and so on. The UE may acquire UL synchronization and UL transmission resources from the RACH procedure.

The RACH procedure may be divided into a contention-based RACH procedure and a contention-free RACH procedure. The contention-based RACH procedure may be divided into a 4-step RACH procedure (4-step RACH) and a 2-step RACH procedure (2-step RACH).

(1) 4-Step RACH: Type-1 Random Access Procedure

Figure 3A:
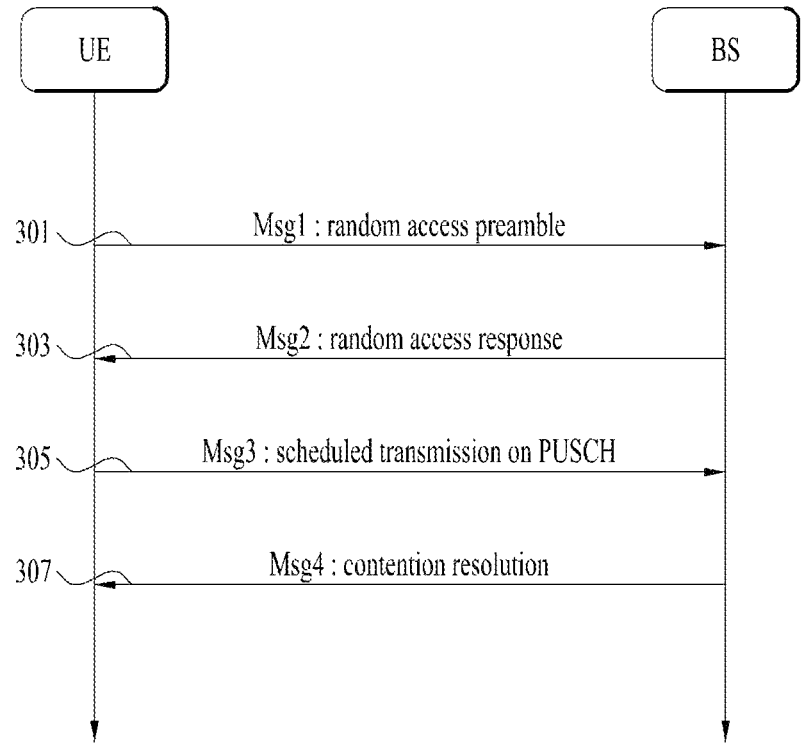
FIGS. 3A and 3B are diagrams illustrating an exemplary 4-step random access channel (RACH) procedure.
Figure 3B:
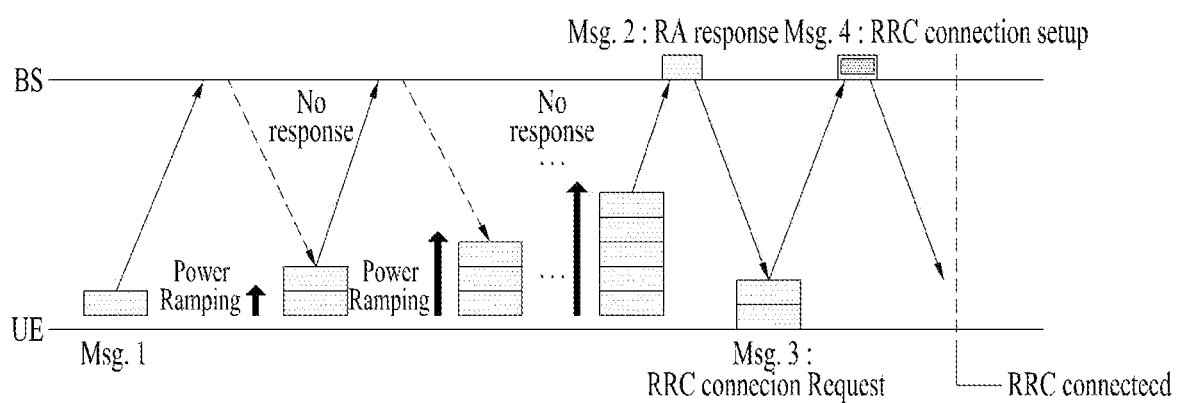

FIGS. 3A and 3B are diagrams illustrating an exemplary 4-step RACH procedure.

If the (contention-based) RACH procedure is performed in four steps (i.e., 4-step RACH procedure), the UE may transmit a message (message 1 (Msg1)) including a preamble related to a specific sequence on a physical random access channel (PRACH) (301) and may receive a response message (random access response (RAR) message) (message 2 (Msg2)) to the preamble on a PDCCH and a PDSCH related thereto (303). The UE may transmit a message (message 3 (Msg3)) including a PUSCH based on scheduling information in the RAR (305). The UE may perform a contention resolution procedure by receiving a PDCCH signal and a PDSCH signal related thereto. To this end, the UE may receive a message (message 4 (Msg4)) containing contention resolution information on the contention resolution procedure from the BS (307).

The 4-step RACH procedure of the UE may be summarized as shown in Table 2 below.

TABLE 2

| | Type of Signals | Operations/Information obtained |
|---|---|---|
| 1$^{st}$ step | PRACH preamble in UL | Initial beam obtainment Random selection of RA-preamble ID |
| 2$^{nd}$ step | Random Access Response on DL-SCH | Timing Advanced information RA-preamble ID Initial UL grant, Temporary C-RNTI |
| 3$^{rd}$ step | UL transmission on UL-SCH | RRC connection request UE identifier |
| 4$^{th}$ step | Contention Resolution on DL | Temporary C-RNTI on PDCCH for initial access C-RNTI on PDCCH for UE in RRC_CONNECTED |

First, the UE may transmit a random access preamble over a PRACH in UL as Msg1 of the RACH procedure.

Random access preamble sequences of two different lengths are supported. Long sequence length 839 is applied with SCSs of 1.25 and 5 kHz, and short sequence length 139 is applied with SCSs of 15, 30, 60 and 120 kHz.

Multiple preamble formats are defined by one or more RACH OFDM symbols and different cyclic prefixes (and/or guard times). The RACH configuration for the initial bandwidth of a primary cell (Pcell) may be included in system information of the cell and provided to the UE. The RACH configuration includes information on the SCS of the PRACH, available preambles, preamble formats, and the like. The RACH configuration includes information on association between SSBs and RACH (time-frequency) resources. The UE transmits the random access preamble on a RACH time-frequency resource associated with a detected or selected SSB.

The threshold of SSBs may be configured by the network for association with RACH resources. The RACH preamble may be transmitted or retransmitted based on SSB(s) having reference signal received power (RSRP) measured based thereon satisfying the threshold. For example, the UE may select one of the SSB(s) that satisfy the threshold and transmit or retransmit the RACH preamble based on a RACH resource associated with the selected SSB. For example, upon retransmission of the RACH preamble, the UE may reselect one of the SSB(s) and retransmit the RACH preamble based on a RACH resource associated with the reselected SSB. That is, the RACH resource for retransmission of the RACH preamble may be the same as and/or different from the RACH resource for transmission of the RACH preamble.

When the BS receives a random access preamble from the UE, the BS transmits an RAR message (Msg2) to the UE. A PDCCH scheduling a PDSCH carrying the RAR is cyclic redundancy check (CRC) scrambled with a random access (RA) radio network temporary identifier (RNTI) (RA-RNTI) and then transmitted. Upon detecting the PDCCH CRC-scrambled with the RA-RNTI, the UE may receive the RAR from the PDSCH scheduled by DCI carried on the PDCCH. The UE checks whether the RAR includes RAR information in response to the preamble transmitted by the UE, i.e., Msg1. The presence or absence of the RAR information in response to Msg1 transmitted by the UE may be determined depending on whether there is a random access preamble ID for the preamble transmitted by the UE. If there is no response to Msg1, the UE may retransmit the RACH preamble within a predetermined number of times while performing power ramping. The UE may calculate PRACH transmission power for retransmitting the preamble based on the most recent transmission power, power increment, and power ramping counter.

The RAR information may include a preamble sequence transmitted by the UE, a temporary cell-RNTI (TC-RNTI) allocated by the BS to the UE that has attempted random access, and UL transmit time alignment information, UL transmission power adjustment information, and UL radio resource allocation information. If the UE receives the RAR information for itself on the PDSCH, the UE may obtain timing advance information for UL synchronization, an initial UL grant, a TC-RNTI. The timing advance information may be used to control a UL signal transmission timing. To better align PUSCH/PUCCH transmission by the UE with the subframe timing at the network, the network (e.g., BS) may obtain the timing advance information based on timing information detected from a PRACH preamble received from the UE and transmit the timing advance information to the UE. The UE may transmit a UL signal over a UL shared channel based on the RAR information as Msg3 of the RACH procedure. Msg3 may include an RRC connection request and a UE identifier. In response to Msg3, the network may transmit Msg4, which may be treated as a contention resolution message on DL. Upon receiving Msg4, the UE may enter the RRC_CONNECTED state.

As described above, a UL grant in the RAR may schedule PUSCH transmission to the BS. A PUSCH carrying initial UL transmission based on the UL grant in the RAR is also referred to as a Msg3 PUSCH. The content of an RAR UL grant may start at the MSB and end at the LSB, and the content may be given as shown in Table 3.

TABLE 3

| RAR UL grant field | Number of bits |
|---|---|
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

A TPC command is used to determine the transmission power of the Msg3 PUSCH. For example, the TPC command may be interpreted as shown in Table 4.

TABLE 4

| TPC command | value [dB] |
|---|---|
| 0 | −6 |
| 1 | −4 |
| 2 | −2 |
| 3 | 0 |
| 4 | 2 |
| 5 | 4 |
| 6 | 6 |
| 7 | 8 |

(2) 2-Step RACH: Type-2 Random Access Procedure

Figure 4:
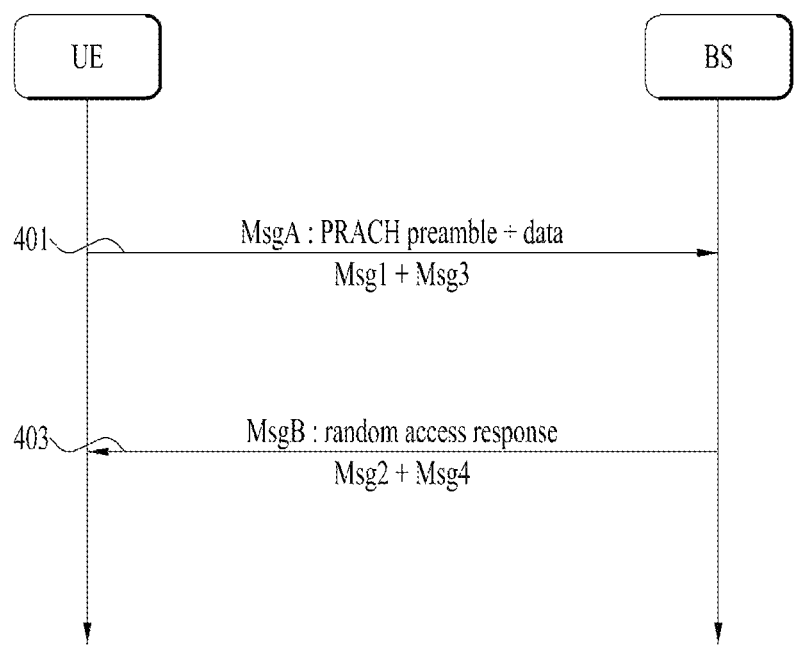
FIG. 4 is a diagram illustrating an exemplary 2-step RACH procedure.

FIG. 4 is a diagram illustrating an exemplary 2-step RACH procedure.

The 2-step RACH procedure in which the (contention-based) RACH procedure is performed in two steps has been proposed to simplify the RACH procedure, that is, to achieve low signaling overhead and low latency.

The operations of transmitting Msg1 and Msg3 in the 4-step RACH procedure may be performed as one operation in the 2-step RACH procedure where the UE transmits one message (message A (MsgA)) including a PRACH and a PUSCH. The operations in which the BS transmits Msg2 and Msg4 in the 4-step RACH procedure may be performed as one operation in the 2-step RACH procedure where the BS transmits one message (message B (MsgB)) including an RAR and contention resolution information.

That is, in the 2-step RACH procedure, the UE may combine Msg1 and Msg3 of the 4-step RACH procedure into one message (e.g., MsgA) and transmit the one message to the BS (401).

In addition, in the 2-step RACH procedure, the BS may combine Msg2 and Msg4 of the 4-step RACH procedure into one message (e.g., MsgB) and transmit the one message to the UE (403).

Based on the combination of these messages, the 2-step RACH procedure may provide a low-latency RACH procedure.

Specifically, MsgA of the 2-step RACH procedure may include a PRACH preamble contained in Msg1 and data contained in Msg3. MsgB of the 2-step RACH procedure may include an RAR contained in Msg2 and contention resolution information contained in Msg4.

(3) Contention-Free RACH

Figure 5:
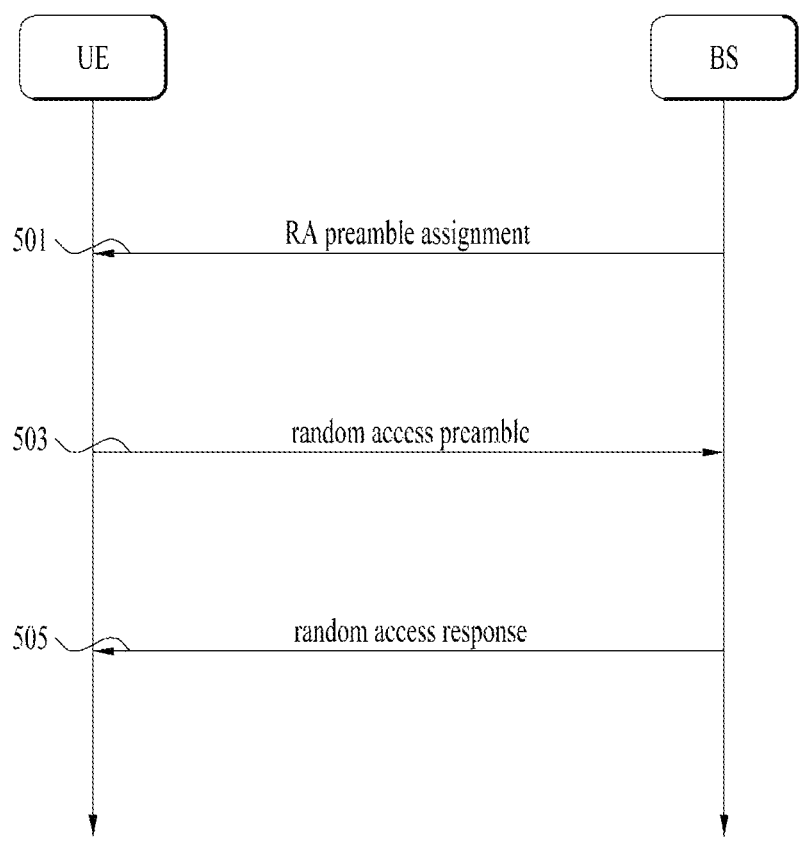
FIG. 5 is a diagram illustrating an exemplary contention-free RACH procedure.

FIG. 5 is a diagram illustrating an exemplary contention-free RACH procedure.

The contention-free RACH procedure may be used when the UE is handed over to another cell or BS or when requested by a command from the BS. The basic steps of the contention-free RACH procedure are similar to those of the contention-based RACH procedure. However, in the contention-free RACH procedure, the BS allocates a preamble to be used by the UE (hereinafter, dedicated random access preamble) to the UE (501), unlike the contention-based RACH procedure in which the UE arbitrarily selects a preamble to be used from among a plurality of random access preambles. Information on the dedicated random access preamble may be included in an RRC message (e.g., handover command) or provided to the UE through a PDCCH order. When the RACH procedure is initiated, the UE transmits the dedicated random access preamble to the BS (503). When the UE receives an RAR from the BS, the RACH procedure is completed (505).

In the contention-free RACH procedure, a CSI request field in an RAR UL grant indicates whether the UE includes an aperiodic CSI report in corresponding PUSCH transmission. The SCS for Msg3 PUSCH transmission is provided by an RRC parameter. The UE may transmit a PRACH and a Msg3 PUSCH on the same UL carrier of the same serving cell. The UL BWP for Msg3 PUSCH transmission is indicated by system information block 1 (SIB1).

DL Channel Structures

An eNB transmits related signals on later-described DL channels to a UE, and the UE receives the related signals on the DL channels from the eNB.

(1) Physical Downlink Shared Channel (PDSCH)

The PDSCH carries DL data (e.g., a DL-shared channel transport block (DL-SCH TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

(2) Physical Downlink Control Channel (PDCCH)

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH uses a fixed modulation scheme (e.g., QPSK). One PDCCH includes 1, 2, 4, 8, or 16 control channel elements (CCEs) according to its aggregation level (AL). One CCE includes 6 resource element groups (REGs), each REG being defined by one OFDM symbol by one (P)RB.

Figure 6:
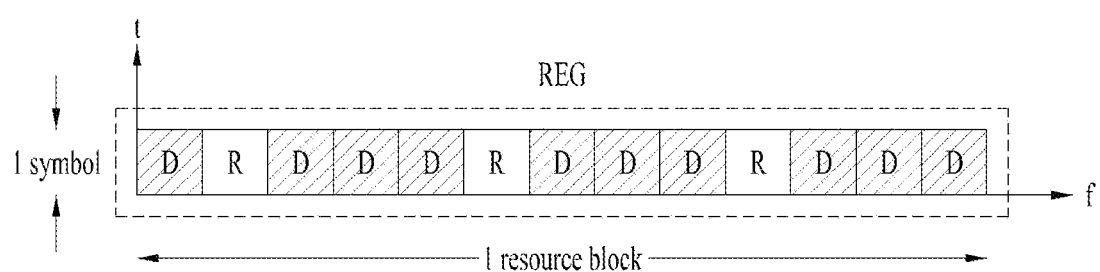
FIGS. 6, 7A, 7B, and 8 are diagrams illustrating a physical downlink control channel (PDCCH) in the NR system.

FIG. 6 illustrates an exemplary structure of one REG. In FIG. 6, D represents an RE to which DCI is mapped, and R represents an RE to which a DMRS is mapped. The DMRS is mapped to RE #1, RE #5, and RE #9 along the frequency direction in one symbol.

The PDCCH is transmitted in a control resource set (CORESET). The CORESET corresponds to a set of physical resources/parameters used to deliver the PDCCH/DCI in a BWP. For example, the CORESET is defined as a set of REGs with a given numerology (e.g., an SCS, a CP length, or the like). The CORESET may be configured by system information (e.g., a master information block (MIB)) or UE-specific higher-layer signaling (e.g., RRC signaling). For example, the following parameters/information may be used to configure a CORESET, and a plurality of CORESETs may overlap with each other in the time/frequency domain.

controlResourceSetId: indicates the ID of a CORESET.

frequencyDomainResources: indicates the frequency area resources of the CORESET.

The frequency area resources are indicated by a bitmap, and each bit of the bitmap corresponds to an RB group (i.e., six consecutive RBs). For example, the most significant bit (MSB) of the bitmap corresponds to the first RB group of a BWP. An RB group corresponding to a bit set to 1 is allocated as frequency area resources of the CORESET.

duration: indicates the time area resources of the CORESET. It indicates the number of consecutive OFDMA symbols in the CORESET. For example, the duration is set to one of 1 to 3.

cce-REG-MappingType: indicates a CCE-to-REG mapping type. An interleaved type and a non-interleaved type are supported.
precoderGranularity: indicates a precoder granularity in the frequency domain.
tci-StatesPDCCH: provides information indicating a transmission configuration indication (TCI) state for the PDCCH (e.g., TCI-StateID). The TCI state is used to provide the quasi-co-location relation between DL RS(s) in an RS set (TCI-state) and PDCCH DMRS ports.
tci-PresentInDCI: indicates whether a TCI field is included in DCI.
pdcch-DMRS-ScramblingID: provides information used for initialization of a PDCCH DMRS scrambling sequence.

For each CORESET, a precoder granularity in the frequency domain is set to one of the followings by higher-layer signaling:
sameAsREG-bundle: It equals to an REG bundle size in the frequency domain.
allContiguousRBs: It equals to the number of contiguous RBs in the frequency domain within the CORESET.

The REGs of the CORESET are numbered in a time-first mapping manner. That is, the REGs are sequentially numbered in an ascending order, starting from 0 for the first OFDM symbol of the lowest-numbered RB in the CORESET.

Figures 7A, 7B:
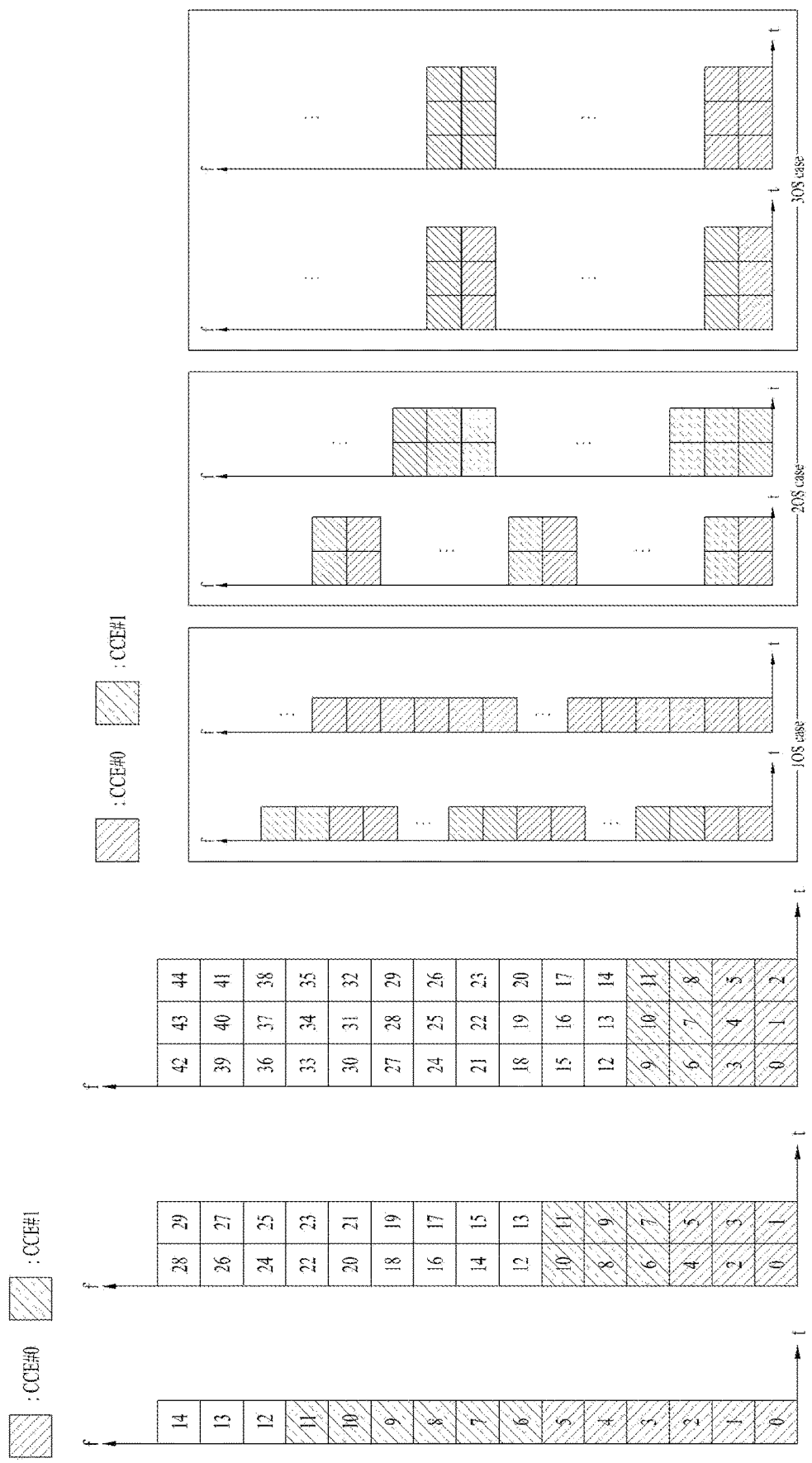

CCE-to-REG mapping for the CORESET may be an interleaved type or a non-interleaved type. FIG. 7A is an exemplary view illustrating non-interleaved CCE-REG mapping, and FIG. 7B is an exemplary view illustrating interleaved CCE-REG mapping.

Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved in the CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

Figure 8:
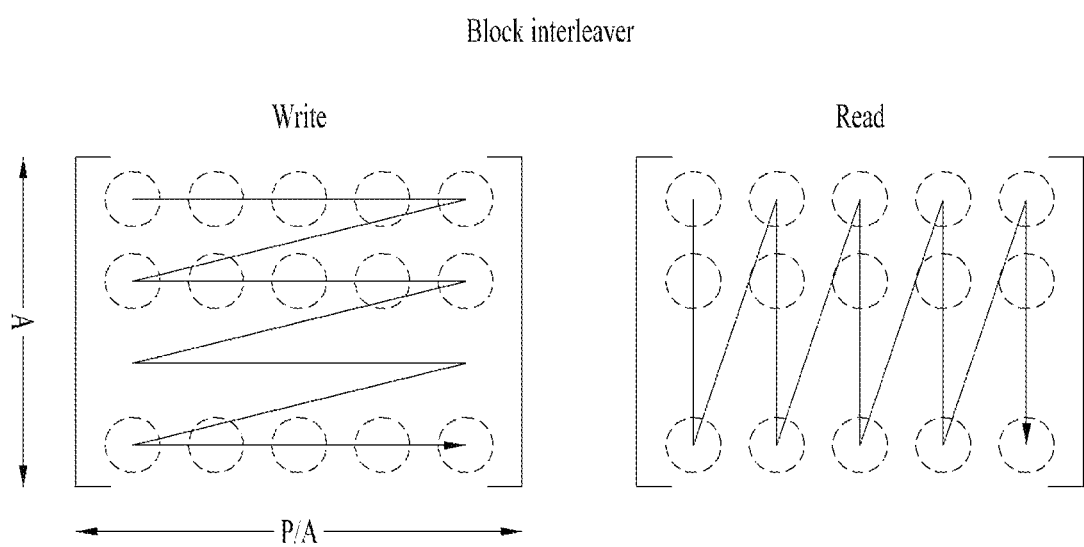
Figure 12:
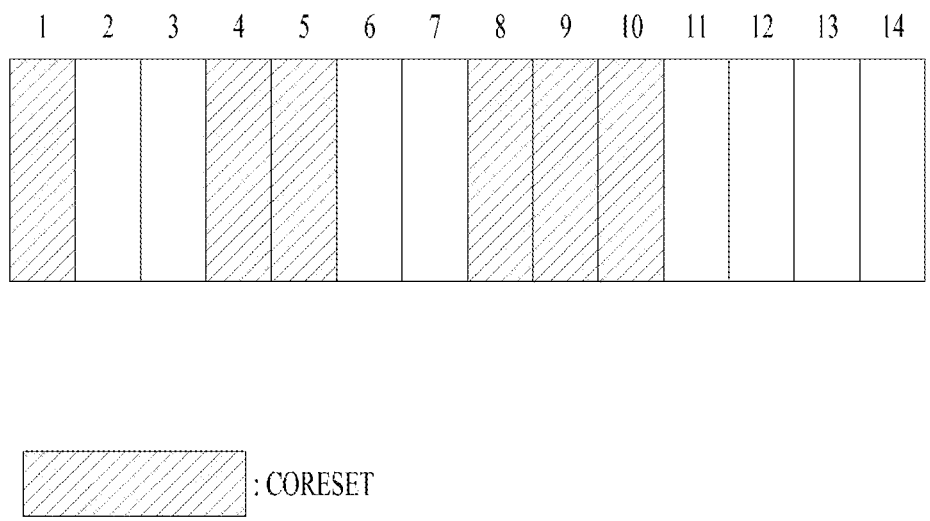

FIG. 8 illustrates an exemplary block interleaver. For the above interleaving operation, the number A of rows in a (block) interleaver is set to one or 2, 3, and 6. When the number of interleaving units for a given CORESET is P, the number of columns in the block interleaver is P/A. In the block interleaver, a write operation is performed in a row-first direction, and a read operation is performed in a column-first direction, as illustrated in FIG. 12. Cyclic shift (CS) of an interleaving unit is applied based on an ID which is configurable independently of a configurable ID for the DMRS.

To receive the PDCCH, the UE may monitor (e.g., blind-decode) a set of PDCCH candidates in the CORESET. The PDCCH candidates are CCE(s) that the UE monitors for PDCCH reception/detection. The PDCCH monitoring may be performed in one or more CORESETs in an active DL BWP on each active cell configured with PDCCH monitoring. A set of PDCCH candidates monitored by the UE is defined as a PDCCH search space (SS) set. The SS set may be a common search space (CSS) set or a UE-specific search space (USS) set.

Table 5 lists exemplary PDCCH SSs.

TABLE 5

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| UE Specific | UE Specific | C-RNTI, or MCS-C-RNTI, or CS-RNTI(s) | User specific PDSCH decoding |

The SS set may be configured by system information (e.g., MIB) or UE-specific higher-layer (e.g., RRC) signaling. S or fewer SS sets may be configured in each DL BWP of a serving cell. For example, the following parameters/information may be provided for each SS set. Each SS set may be associated with one CORESET, and each CORESET configuration may be associated with one or more SS sets. -searchSpaceId: indicates the ID of the SS set.
controlResourceSetId: indicates a CORESET associated with the SS set.
monitoringSlotPeriodicityAndOffset: indicates a PDCCH monitoring periodicity (in slots) and a PDCCH monitoring offset (in slots).
monitoringSymbolsWithinSlot: indicates the first OFDMA symbol(s) for PDCCH monitoring in a slot configured with PDCCH monitoring. The OFDMA symbols are indicated by a bitmap and each bit of the bitmap corresponds to one OFDM symbol in the slot. The MSB of the bitmap corresponds to the first OFDM symbol of the slot. OFDMA symbol(s) corresponding to bit(s) set to 1 corresponds to the first symbol(s) of the CORESET in the slot.
nrofCandidates: indicates the number of PDCCH candidates (e.g., one of 0, 1, 2, 3, 4, 5, 6, and 8) for each AL={1, 2, 4, 8, 16}.
searchSpaceType: indicates whether the SS type is CSS or USS.
DCI format: indicates the DCI format of PDCCH candidates.

The UE may monitor PDCCH candidates in one or more SS sets in a slot based on a CORESET/SS set configuration. An occasion (e.g., time/frequency resources) in which the PDCCH candidates should be monitored is defined as a PDCCH (monitoring) occasion. One or more PDCCH (monitoring) occasions may be configured in a slot.

Table 6 illustrates exemplary DCI formats transmitted on the PDCCH.

TABLE 6

| DCI format | Usage |
|---|---|
| 0_0 | Scheduling of PUSCH in one cell |
| 0_1 | Scheduling of PUSCH in one cell |
| 1_0 | Scheduling of PDSCH in one cell |

TABLE 6-continued

| DCI format | Usage |
|---|---|
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 11 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs. DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

Reduced Capability (RedCap)

The flexibility and expandability of 5G NR expand a 5G ecosystem and enable more and more devices to connect to a network in order to solve new use cases. To this end, in an NR system, support of a RedCap device is under discussion. The introduction of the NR RedCap device may expand an ecosystem of the NR system based on use cases described below.

Use Cases

Use cases of NR RedCap may include wearable devices (e.g., smartwatches, wearable medical devices, and AR/VR goggles), industrial wireless sensors, and video surveillance devices. [Table 7] below lists detailed use cases of RedCap.

TABLE 7

| | Data Rate | Latency | Availability/ Reliability | Battery LifeTime | Device Size |
|---|---|---|---|---|---|
| Wearable | Reference data rate: 5-50 Mbps in downlink and 2-5 Mbps in uplink | Relaxed | N/A | At least several days and up to 1-2 weeks | Compact form factor |
| Industrial wireless sensors | <2 Mbps | <100 ms | 99.99% | At least a few years | N/A |

TABLE 7-continued

| | Data Rate | Latency | Availability/ Reliability | Battery LifeTime | Device Size |
|---|---|---|---|---|---|
| Video surveillance | 2-4 Mbps for economic video and 7.5-25 Mbps for high-end video | <500 ms | 99%-99.9% | N/A | N/A |

Referring to Table 7, three use cases have lower requirements in terms of data rate and latency than eMBB use cases. On the other hand, RedCap use cases have significantly different requirements from low-power wide-area (LPWA) use cases in current long-term evolution machine (LTE-M) and narrowband IoT (NB-JoT) solutions. For example, the data rate of RedCap may be higher than that of LPWA. In addition, there may be restrictions on a device form factor for a specific wearable use case. In other words, it is considered that a RedCap device will have a segment which is lower than eMBB and higher than an LPWA device.

RedCap Device Capability

[Table 8] shows comparison of the capability of an NR Rel 15 device with that of a RedCap device. Reducing bandwidth, reducing the maximum number of MIMO layers, and mitigating a maximum downlink modulation order may all aid in reducing baseband complexity.

TABLE 8

| | FR1 | | FR2 | |
|---|---|---|---|---|
| | Rel 15 Device | RedCap Device | Rel 15 Device | RedCap Device |
| Maximum device Bandwidth | 100 MHZ | 20 MHZ | 200 MHZ | 100 MHz |
| Minimum number of device receive branches | 2 or 4, depending on the frequency band | 1 for bands where a baseline NR device is required to have 2 TBD: 1 or 2 for bands where a baseline NR device is required to have 4 | 2 | 1 |
| Maximum number of downlink MIMO layers | 2 or 4, depending on the frequency band | 1 for RedCap device with 1 Rx branch 2 for RedCap device with 2 Rx branches | 2 | 1 |
| Maximum downlink modulation order | 256 QAM | 64 QAM | 64 QAM | 64 QAM |
| Duplex operation | FD-FDD, TDD | UE may implement HD-FDD, FD-FDD, TDD | TDD | TDD |

In an Rel-17 NR system, research on the RedCap device is underway. A RedCap UE may be configured to have higher requirements than a legacy LPWA (i.e., LTE-M/NB IoT) UE and lower requirements than a URLLC/eMBB UE.

Meanwhile, the RedCap UE may support a bandwidth (BW) of 20 MHz and a BW of 100 MHz in frequency range (FR) 1 and FR2, respectively. To this end, a separate dedicated initial bandwidth part (BWP) may be configured for the RedCap UE.

In Rel-18 RedCap study (R18-NR_redcap_enh), a further reduction in complexity is required to expand a use case market of the RedCap UE having requirements of relatively low cost, relatively low energy consumption, and relatively low data rate. Rel-18 RedCap should support a device of a lower level between the LPWA UE and the Rel-17 RedCap UE and, for this purpose, a target peak data rate of Rel-18 RedCap is set to 10 Mbps. To this end, it is assumed that the Rel-18 RedCap UE supports a BW of up to 5 MHz, which is smaller than a BW of 20 MHz BW, in FR1 of the legacy Rel-17 RedCap UE and supports a subcarrier spacing (SCS) of 15 kHz or 30 kHz. It is also assumed that the Rel-18 RedCap UE does not support FR2.

If the Rel-18 RedCap UE supports a BW of up to 5 MHz, the Rel-18 RedCap UE may not properly support configurations on a legacy NR system. On the other hand, in the case of NR bands, there are bands that may support a BW of 5 MHz, so that the Rel-18 RedCap UE may be supported in the corresponding bands. A maximum transmission BW at a BW of 5 MHz is configured as listed in Table 9 below.

TABLE 9

| SCS (kHz) | 5 MHz NRB | 10 MHz NRB | 15 MHz NRB | 20 MHZ NRB | 25 MHz NRB | 30 MHz NRB | 40 MHZ NRB | 50 MHz NRB | 60 MHz NRB | 70 MHz NRB | 80 MHz NRB | 90 MHz NRB | 100 MHz NRB |
|---|---|---|---|---|---|---|---|---|---|---|---|---|---|
| 15 | 25 | 52 | 79 | 106 | 133 | 160 | 216 | 270 | N/A | N/A | N/A | N/A | N/A |
| 30 | 11 | 24 | 38 | 51 | 65 | 78 | 106 | 133 | 162 | 189 | 217 | 245 | 273 |
| 60 | N/A | 11 | 18 | 24 | 31 | 38 | 51 | 65 | 79 | 93 | 107 | 121 | 135 |

Table 9 has been excerpted from TS 38.101. Referring to Table 9, the maximum transmittable BW at a BW of 5 MHz is 25 RBs based on an SCS of 15 kHz or 11 RBs based on an SCS of 30 kHz. In other words, the BW of the Rel-18 RedCap UE is configurable up to 25 RBs or 11 RBs. Therefore, there may be restrictions on a control resource set (CORESET) configuration. For example, only some of configurations of a synchronization signal block (SSB) of the legacy NR system and a CORESET for a Type0-PDCCH common search space (CSS) set may be used.

TABLE 10

| Index | SS/PBCH block and CORESET multiplexing pattern | Number of RBs NRBCORESET | Number of Symbols NsymbCORESET | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |
| 12 | 1 | 96 | 1 | 38 |
| 13 | 1 | 96 | 2 | 38 |
| 14 | 1 | 96 | 3 | 38 |
| 15 | Reserved | | | |

Table 10 has been excerpted from TS 38.213 and lists configurations of a CORESET for a Type0-PDCCH CSS set available in an SCS of 15 kHz and a BW of 5 MHz. Referring to Table 10, the Rel-18 RedCap UE may use only configurations of index 0 to index 5 among index 0 to index 15 available in Table 10. It may be difficult for the Rel-18 RedCap UE to use the other indexes (i.e., indexes 6 to 15) because the number of CORESET resource blocks (RBs) exceeds 25.

Meanwhile, since all configurations exceed 11 RBs in an SCS of 30 kHz and a BW of 5 MHz, a new configuration dedicated to the Rel-18 RedCap UE may be required, or an SSB of 24 RB s may need to be punctured to be suitable for B W allowed for the UE.

In the NR system, a control channel is transmitted and received based on blind decoding for resources configured by a CORESET and a search space (SS) set. The CORESET may define a resource region in which the control channel may be transmitted and characteristics of the resource region. In the resource region, the size and location of the CORESET in the frequency domain and the size of the CORESET in the time domain may be allocated by a network. Meanwhile, the location of the CORESET in the time domain may be determined by the SS set. The characteristics of the resource region may be defined by whether an REG bundle is interleaved and/or by an REG bundle size, interleaving-related parameters, precoder granularity, antenna port quasi co-location (QCL) information, and/or DMRS scrambling information. The above information may be indicated by a base station (BS) to a UE.

A resource unit for control channel transmission is defined as an REG, an REG bundle, and/or a control channel element (CCE). One CCE corresponds to 6 REGs, and one REG is defined as one symbol in the time domain and one resource block (RB) in the frequency domain. That is, one REG may correspond to 12 REs. One PDCCH candidate through which a PDCCH is capable of being actually transmitted may include 1, 2, 4, 8, or 16 CCEs, and the number of CCEs constituting one PDCCH candidate through which the PDCCH is capable of being transmitted is configured is referred to as an aggregation level (AL). In the case of a 1-symbol CORESET, a transmission BW of 96 RBs (=about 20 MHz) is required to transmit a PDCCH of AL 16 and, in the case of a 2-symbol CORESET and a 3-symbol CORESET, transmission BWs of 48 RBs and 32 RBs are respectively required to transmit the PDCCH of AL 16.

The Rel-18 RedCap UE may operate in a transmission BW of up to 5 MHz due to BW reduction. Therefore, it may be difficult to transmit a PDCCH of a higher AL with a current CORESET configuration.

The RedCap UE may require a higher AL than the legacy eMBB/URLLC UE in order to compensate for coverage degradation due to RedCap.

Therefore, in order to solve the above-described problems, the present disclosure proposes methods of configuring a control channel in a limited BW of the RedCap UE. To this end, the proposed methods may include a method of configuring an AL which is not introduced in the legacy NR system and supporting the AL and a method of configuring a CORESET for the RedCap UE. The following proposed methods may be implemented alone or in combination.

Hereinafter, the methods proposed in the present disclosure will be described based on the Rel-18 RedCap UE having a limited BW. However, it may be understood by those skilled in the art that the methods proposed in the present disclosure are not limited thereto and may be extended and applied to other methods for compensating for PDCCH reception performance (e.g., for improving PDCCH reception performance of a UE having a sufficiently large BW but insufficient coverage).

Therefore, it is obvious that the methods proposed in the present disclosure may be applied to all types of transmission/reception methods expected by the BS and the UE as long as the principle of the present disclosure is not violated, even if there is no separate explanation.

Hereinafter, while the NR system will be exemplarily described in order to explain the principle of the proposed methods, the proposed methods do not specifically limit the transmission/reception form of the NR system unless otherwise specified. In addition, while the present disclosure exemplarily describes the characteristics and structure of the Rel-18 RedCap UE in order to explain the principle of the proposed methods, the proposed methods are not particularly limited to support of the RedCap UE unless otherwise specified. Therefore, it is obvious that the methods proposed in the present disclosure may be applied to all structures and services of wireless communication transmission/reception, as long as the principle of the proposed methods is not violated, even if a separate description is not given.

In the following description, each method or option is intentionally distinguished for clarity of explanation and is not limitedly construed as meaning that each method or option should be practiced as an independent form. For example, each of methods/options described below may be implemented individually, but at least some thereof may be implemented in a combined form within a range that does not conflict with each other.

The present disclosure proposes methods in which the BS configures/indicates a CORESET for/to the UE having a limited (or reduced) BW. Therethrough, even if UEs including the Rel-18 RedCap UE have a limited BW, a CORESET for the UEs may be configured even without changing configuration in the existing NR standard, and deteriorated reception performance due to RedCap may be preserved.

Figure 9:
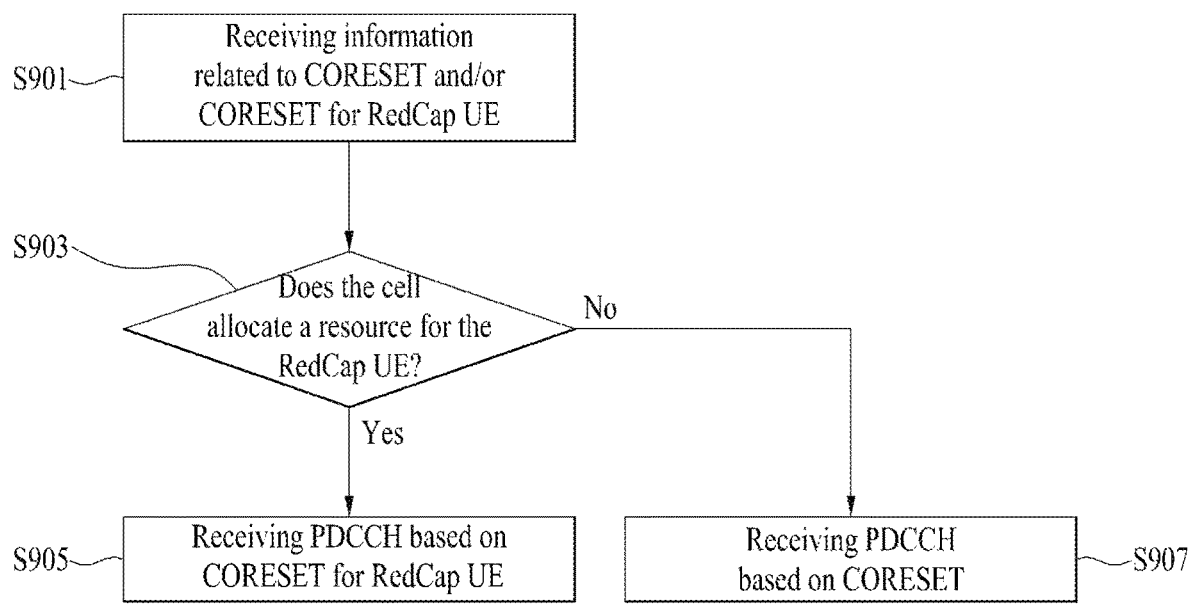
FIGS. 9, 10 and 11 are diagrams for explaining the overall operation processes of a UE and a BS according to an embodiment of the present disclosure.
Figure 10:
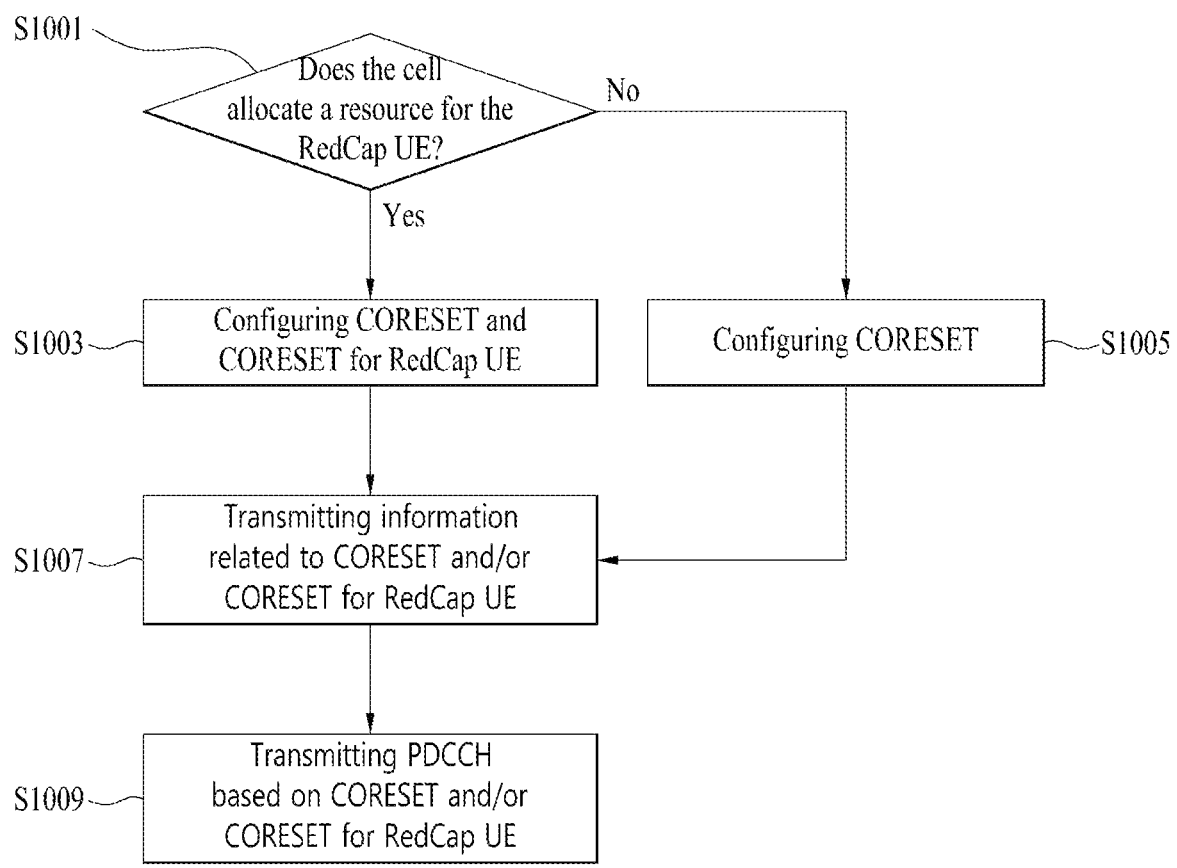

FIGS. 9 and 10 are diagrams illustrating the overall operation processes of a UE and a BS according to an embodiment of the present disclosure. If the UE is in a state before radio resource control (RRC) connection, the operation processes may be used for an example of a random access operation in which the UE receives system information using CORESET #0 for the RedCap UE and an example of an operation in which the BS configures CORESET #0 for the RedCap UE in consideration of the RedCap UE.

Referring to FIG. 9, an RRC connected UE may receive information related to a CORESET and/or a CORESET for the RedCap UE from the BS (S901). The UE may check whether a cell allows allocation of a separate control channel resource for the RedCap UE through the received information (S903). For example, the received information may include information about whether to allow allocation of the separate control channel resource for the RedCap UE. If the received information includes information about the CORESET for the RedCap UE, the UE may recognize that allocation of the separate control channel for the RedCap UE is allowed.

If allocation of the separate control channel resource for the RedCap UE is allowed by the corresponding cell, the UE may receive a PDCCH based on the CORESET for the RedCap (S905). If allocation of the separate control channel resource for the RedCap UE is not allowed by the corresponding cell, the RedCap UE may receive the PDCCH based on a CORESET that all UEs may commonly use (S905).

A detailed operation of the RedCap UE according to S901 to S907 described above may be based on at least one of [Method 1] and [Method 2].

The above-described process is the operation of the RedCap UE that is RRC-connected.

The operation of the RedCap UE before RRC connection will now be described. Before RRC connection, the RedCap UE initiates random access. For example, the UE may receive an SSB from the BS for random access. The UE may also obtain a master information block (MIB) through a PBCH of the SSB. The UE may also obtain information related to CORESET #0 for the RedCap UE and/or CORESET #0 through the MIB (S901). Here, CORESET #0 may mean a CORESET for a Type-0 PDCCH CSS set for a normal UE. In addition, CORESET #0 for the RedCap UE may mean CORESET #0 for a separate Type-0 PDCCH CSS set for a UE with a limited BW (e.g., RedCap UE) as CORESET #0 configured according to the proposed methods of the present disclosure.

The UE may check whether a corresponding cell allows allocation of the separate control channel resource for the RedCap UE through the obtained information (S903). For example, the obtained information may include information about whether to allow allocation of a separate control channel resource for the RedCap UE. If the obtained information includes information about CORESET #0 for the RedCap UE, the UE may recognize that allocation of the separate control channel for the RedCap UE is allowed.

If allocation of the separate control channel resource for the RedCap UE is allowed by the corresponding cell, the UE may receive system information of the cell based on CORESET #0 for the RedCap UE (S905). If allocation of the separate control channel resource for the RedCap UE is not allowed by the corresponding cell, the RedCap UE may receive the system information of the cell based on CORESET #0 that all UEs may commonly use (S905). For example, the RedCap UE may receive a PDCCH that schedules SIB1 through CORESET #0 for the RedCap UE or CORESET #0. The RedCap UE may receive SIB1 based on the PDCCH.

The detailed operation of the RedCap UE according to S901 to S907 described above may be based on at least one of [Method 1] and [Method 2].

FIG. 10 illustrates an example of an operation in which a BS configures a CORESET for RedCap in consideration of a RedCap UE in a corresponding cell. Here, the CORESET for RedCap means a separate CORESET for a UE with a limited BW (e.g., RedCap UE), configured according to the proposed methods of the present disclosure. The operation of the BS in an RRC connected state will now be described.

The BS may determine whether a separate control channel resource for the RedCap UE is allocated (S1001). When a corresponding cell allows allocation of the separate control channel resource for the RedCap UE, the BS may separately configure a CORESET and a CORESET for RedCap (S1003). If the corresponding cell does not allow allocation of the separate control channel resource for the RedCap UE, the BS may configure a CORESET that all UEs may use in common (S1005). The BS may transmit information including the CORESET and/or the CORESET for the RedCap UE configured according to S1003 or S1005 to the UE (S1007). In addition, the BS may transmit a PDCCH through the CORESET and/or the CORESET for the RedCap UE (S1009).

A specific operation of the BS according to S1001 to S1009 described above may be based on at least one of [Method 1] and [Method 2].

Meanwhile, the BS before an RRC connected state may configure system information (e.g., SIB1) of a cell. In this case, the BS may determine whether the corresponding cell allocates a separate control channel resource for random access (or initial access) for the RedCap UE (S1001). If the corresponding cell allows allocation of the separate control channel resource for the RedCap UE, the BS may separately configure CORESET #0 and CORESET #0 for RedCap (S1003). If the corresponding cell does not allow allocation of the separate control channel resource for the RedCap UE, the BS configures CORESET #0 that all UEs may commonly use (S1005). The BS may transmit information including CORESET #0 and/or CORESET #0 for the RedCap UE configured according to S1003 or S1005 to the UE (S1007). In addition, the BS may transmit the PDCCH through CORESET #0 and/or CORESET #0 for the RedCap UE and transmit system information based on the PDCCH. For example, the system information may be SIB1, and the PDCCH may be for scheduling SIB1 (S1009).

A detailed operation of the BS according to S1001 to S1009 described above may be based on at least one of [Method 1] and [Method 2].

Figure 11:
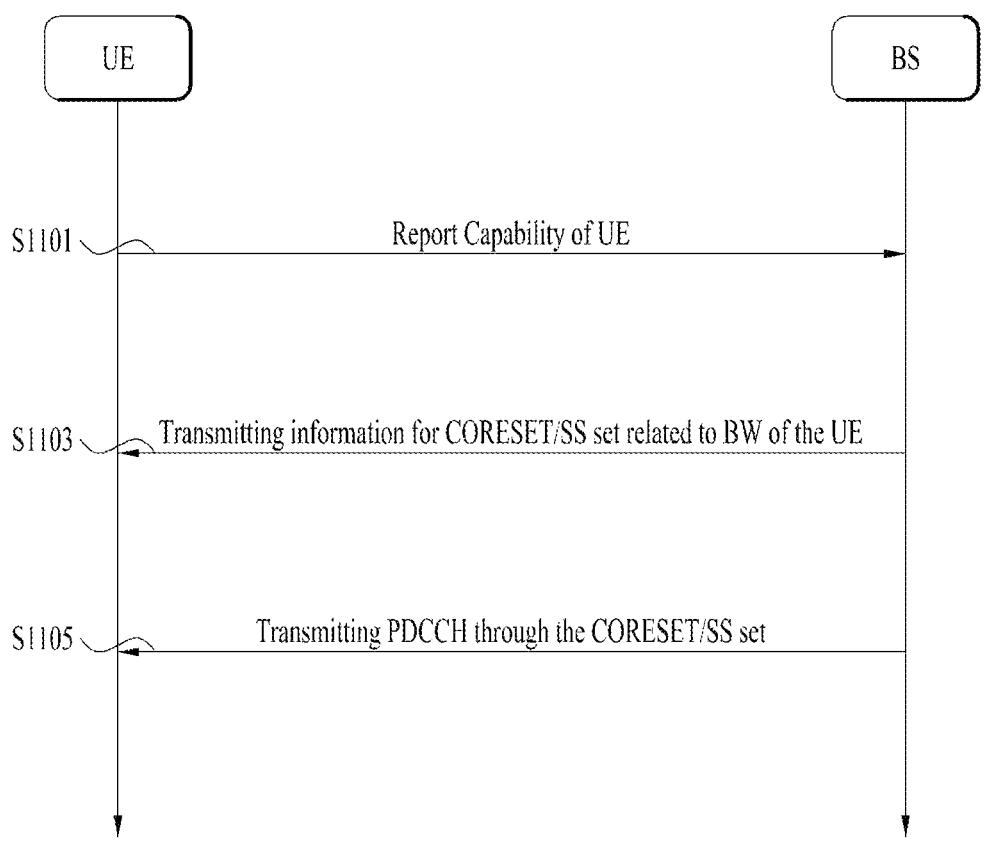

FIG. 11 illustrates an example of a process in which a BS configures a CORESET and an SS set in consideration of a limited BW for an RRC connected RedCap UE and transmits a PDCCH to the RedCap UE based on the configured CORESET and SS set.

The UE may report capability information including a limited BW (e.g., 5 MHz) to the BS (S1101). However, if the UE may inform the BS that the UE is the RedCap UE in a random access procedure (e.g., if early identification has already been performed), a capability reporting procedure may be partially omitted or may not be included in a process for the methods proposed in the present disclosure.

The BS may configure information necessary for PDCCH reception related to a CORESET and an SS set in consideration of the limited BW of the UE and transmit the information to the UE (S1103). The BS may transmit a PDCCH to the UE based on the corresponding information (S1105). Steps S1103 and S1105 may be based on at least one of [Method 1] and [Method 2]. The SS set configured by the BS in consideration of the limited BW of the UE may be a Type-0 PDCCH CSS set, and the CORESET may be CORESET #0 for the Type-0 PDCCH CSS set. In addition, the PDCCH that the UE receives may be a PDCCH for scheduling SIB1, and the BS may transmit SIB1 to the UE based on the corresponding PDCCH.

[Method 1] Method of Maximally Using a Control Channel Resource of the Rel-18 RedCap UE The Rel-18 RedCap UE may use a maximum of 75 REGs (25*3) for a CORESET configuration under the assumption that 25 RBs may be used in a BW of up to 5 MHz in an SCS of 15 kHz. Here, 3 is the maximum number of symbols configurable for the CORESET.

The legacy NR system supports ALs of 1, 2, 4, 8, and 16. AL 16 may be configured using 96 REGs (=16 CCEs*6 REGs/CCE). Therefore, the Rel-18 RedCap UE with a maximum BW of 5 MHz is incapable of fully supporting AL 16.

Assuming that 11 RBs may be used within up to 5 MHz in an SCS of 30 kHz, only 33 REGs (=11*3) may be used for a CORESET configuration. Here, 3 is the maximum number of symbols configurable for the CORESET. In addition, since the CORESET may be configured in units of 6 RBs, a maximum of 18 REGs (=6 RBs*3 symbols) may be used, so that only AL 2 may be fully supported and Al 4 or more may not be supported.

Therefore, it is necessary to configure the CORESET by maximally using a control channel resource that the Rel-18 RedCap UE may utilize. To this end, [Method 1]proposes a new AL capable of maximally using the control channel resource of the Rel-18 RedCap UE and a method for supporting and configuring the new AL. Further, the present disclosure proposes a method for maximally using the control channel resource of the Rel-18 RedCap UE by utilizing a method of the existing NR standard.

In the present disclosure, while an SCS of 15 kHz is mainly described as an example for convenience, the same principle may be applied to an SCS of 30 kHz. For example, the principle of each embodiment may be applied by replacing 75 REGs (=25 RBs*3 symbols) of an SCS of 15 kHz with 33 REGs (=11 RBs*3 symbols) of an SCS of 30 kHz.

[Method 1-1] Method of Supporting a New AL Other than ALs of the Existing NR Standard ALs of 1, 2, 4, 8, and 16 in the legacy NR system are configured using 6, 12, 24, 48, and 96 REGs, respectively. Therefore, if a new AL within 75 REGs in 15 kHz (or within 33 REGs in 30 kHz) that the Rel-18 RedCap UE may utilize is defined/configured, the new AL may be helpful in maximally using the control channel resource of the UE.

For example, AL 12 may be supportably configured for the Rel-18 RedCap UE. AL 12 may be configured using 72 REGs (=12 CCEs*6 REGs/CCE), which may be utilized through 24 RBs and a 3-symbol CORESET configuration (i.e., 24 RBs*3 symbols=72 REGs). This is the same as configuring the control channel resource that may be configured through indexes 3, 4, and 5 of Table 10 as one PDCCH candidate.

A rate matching circular buffer is used to match the length of a DCI payload by generating a codeword in the existing NR standard. In this case, the rate matching circular buffer uses an N-length vector y as an input value and an E-length vector e as an output value. For example, since E is a DCI payload size that may actually be mapped to the control channel, AL 12 may be supported by inserting an E value corresponding to AL 12. In other words, AL 12 may be supported by matching the output size of the rate matching circular buffer to AL 12 without changing the existing NR standard.

Meanwhile, AL 6 may be introduced to support AL 12. In the case of ALs of the existing NR standard, since a higher AL value may be configured in the form of twice an immediately preceding lower AL value, introduction of AL 6 may also be considered when it is desired to introduce AL 12 to support the Rel-18 RedCap UE. Although introduction of AL 6 is not a method for maximally using the control channel resource of the Rel-18 RedCap UE, flexibility in control channel resource mapping may be increased by introducing a value that is half of AL 12.

In this case, AL of 6 may be introduced alone or in combination with AL 12. For example, if AL 6 is introduced, a resource of all of 72 REGs (=24 RBs*3 symbols) may not be allocated to one PDCCH candidate and may be dividedly allocated to two PDCCH candidates.

In order to support the new AL, aggregationLevel12 (or aggregationLevel6) may be added to a lower parameter of parameter nrofCandidates in an RRC configuration of an SS set. In the case of random access (or initial access) before the RRC configuration, the new AL may be supportably configured in CORESET #0 in an initial DL BWP separately configured for the RedCap UE and in an SS set configuration for CORESET #0.

Alternatively, the Rel-18 RedCap UE may interpret a configuration of AL 16 as AL 12 without an additional configuration. That is, if aggregationLevel16, which is a lower parameter of nrofCandidates of the SS set, is configured, the Rel-18 RedCap UE recognizes AL 16 as AL 12 and receives a PDCCH based on AL 12. The BS may also transmit the PDCCH based on AL 12.

On the other hand, the new AL is not limited to the Rel-18 RedCap UE and may be supported for scheduling flexibility of a normal NR UE or for efficient deployment of the control channel resource.

[Method 1-2] Method of Maximally Using the Control Channel Resource of the Rel-18 RedCap UE Based on the Configuration of the Existing NR Standard In order to maximally utilize 75 REGs, which is the control channel resource of the Rel-18 RedCap UE, an existing AL may be utilized.

As a first method, rate matching may be used. Rate matching generally means changing a code rate according to a payload size after generating a codeword.

For example, unlike [Method 1-1], after the BS generates downlink control information (DCI) and a payload according to AL 1, 2, 4, 8, or 16 supportable in the existing NR standard, the BS may perform rate matching according to the control channel resource of the Rel-18 RedCap UE. For example, in order to support a PDCCH candidate utilizing 72 REGs, the BS may (i) generate DCI according to a payload size for AL 16 and perform rate matching (i.e., puncturing) according to 72 REGs. Alternatively, the BS may (ii) generate DCI according to a payload size for AL 8 and perform rate matching (i.e., repetition) according to 72 REGs.

As a second method, a combination of ALs supportable in the existing NR standard may be supported in order to maximally use the control channel resource of the Rel-18 RedCap UE. For example, a combination of AL 8 and AL 4 may be used to support a PDCCH candidate using 72 REGs. Alternatively, a combination of AL 8, AL 4, and AL 1 may be used to support the PDCCH candidate using 75 REGs. While a combination of two ALs is exemplarily described to aid in understanding of the present disclosure, the present disclosure is not limited thereto.

When 72 REGs are supported by a combination of AL 8 and AL 4, the BS may map a control channel resource corresponding to 24 RBs*3 symbols to AL 8 and AL 4. For example, the BS may allocate AL 8 to 16 RBs and allocate AL 4 to 8 RBs. As another example, the BS may allocate AL 8 to 2 symbols and AL 4 to 1 symbol.

In other words, the BS may generate a payload based on 72 REGs and perform CCE-to-REG interleaving by dividing the generated payload into 48 REGs and 24 REGs. In this way, the BS may map a CCE index. In this case, the REG bundle sizes for the two ALs may be different. For example, since the BS performs CCE-to-REG interleaving for each of 48 REGs and 24 REGs, an REG bundle size for 48-REG interleaving and an REG bundle size for 24-REG interleaving may be the same or different.

Alternatively, the BS may generate a payload according to 72 REGs and map the CCE index by performing CCE-to-REG interleaving without dividing the generated payload. This may be similar to supporting AL 12 of [Method 1-1].

That is, even if the payload is generated according to AL 16, the BS may recognize AL 16 as AL 12 and map/transmit the PDCCH, and the UE may also recognize AL 16 as AL 12 and receive the PDCCH based on AL 12.

Alternatively, the BS may dividedly generate a codeword and arrange the codeword according to a payload for AL 8 and a payload for AL 4. For example, the BS may divide the codeword, generate a first payload for AL 8, and then allocate the first payload to 48 REGs. The BS may also generate a second payload for AL 4 and allocate the second payload to 24 REGs. That is, in the above method, the payload is generated based on AL 12 and a resource is allocated according to AL 8 and AL 4, whereas, in this method, the payload is generated according to AL 8 and AL 4 and a resource may be allocated.

The Rel-18 RedCap UE may be configured or necessarily supported such that [Method 1-2] is applied without a separate instruction in an SS set configuration and blind decoding process corresponding to AL 16. Alternatively, [Method 1-2] may be applied when the control channel resource supportable through separate higher layer signaling is configured to be maximally used. Alternatively, [Method 1-2] may be utilized to increase the flexibility of resource allocation by supporting ALs (e.g., AL 6=AL 2+AL 4) that are incapable of being supported in the legacy NR system.

According to [Method 1], even when the UE supports a limited BW (e.g., 5 MHz), a control channel resource corresponding to the limited BW may be allocated, and an AL for the corresponding control channel resource may be supported.

Especially, in the case of [Method 1-1], flexibility in allocating the control channel may be increased by newly supporting an AL suitable for use in the number of REGs that may be used in a limited BW. In addition, a legacy payload generation method and a legacy DCI mapping method may be used without change.

In addition, in the case of [Method 1-2], an AL suitable for use in the number of REGs that may be used in a limited BW is implemented using existing ALs, so that the AL for the limited BW may be implemented without modifying the contents of the existing standard, thereby increasing flexibility in allocating the control channel.

[Method 2] CORESET Extension to Secure a Control Channel Resource of the Rel-18 RedCap UE As described above, the Rel-18 RedCap UE may support a BW of up to 5 MHz. This means that the control channel resource of the UE is limited to a maximum of 25 RBs in the frequency domain. Accordingly, resources exceeding 25 RBs may not be secured in the frequency domain, and more resources for the control channel resource may be secured through the time domain. In the CORESET configuration, duration, which is a parameter indicating the size of the CORESET in the time domain, may be included in the form of integers {1 . . . MaxCoReSetDuration}. Currently, duration may be configured as one of 1, 2, and 3 symbols.

Based on the above description, the present disclosure proposes defining a duration configured as a value larger than 3 in order to increase the control channel resource of the UE. In other words, when the duration is defined in the form of MaxCoReSetDuration=N as described above, it is proposed that N be defined as a natural number exceeding 3.

[Method 2-1] Method of Configuring a CORESET of 4, 5 or 6 Symbols

In an SCS of 15 kHz, AL 16 based on a CORESET configuration of a maximum of 25 RBs*3 symbols of 5 MHz may not be supported. This is because, as described in

[Method 1], 25 RBs*3 symbols may include a maximum of 75 REGs and 96 REGs (=16 CCEs*6 REGs/CCE) are required for AL 16.

Therefore, in order to solve the above-mentioned problem, [Method 2-1]proposes a method of configuring a CORESET exceeding 3 symbols. Elements for currently configuring the CORESET are disclosed in 3GPP TS 38.331 as shown in [Table 11].

TABLE 11

```
-- ASN1START
-- TAG-CONTROLRESOURCESET-START
ControlResourceSet ::=         SEQUENCE {
    controlResourceSetId       ControlResourceSetId,
    frequencyDomainResources        BIT STRING (SIZE (45)),
    duration               INTEGER (1..maxCoReSetDuration),
    cce-REG-MappingType         CHOICE {
        interleaved            SEQUENCE {
            reg-BundleSize        ENUMERATED {n2, n3, n6},
            interleaverSize       ENUMERATED {n2, n3, n6},
            shiftIndex                   INTEGER(0..maxNrofPhysicalResourceBlocks-1)
OPTIONAL -- Need S
        },
        nonInterleaved          NULL
    },
    precoderGranularity         ENUMERATED {sameAsREG-bundle, allContiguousRBs}, tci-StatesPDCCH-ToAddList      SEQUENCE(SIZE (1..maxNrofTCI-StatesPDCCH))
OF TCI-StateId OPTIONAL, -- Cond NotSIB1-initialBWP
    tci-StatesPDCCH-ToReleaseList      SEQUENCE(SIZE (1..maxNrofTCI-StatesPDCCH))
OF TCI-StateId OPTIONAL, -- Cond NotSIB1-initialBWP
    tci-PresentInDCI            ENUMERATED {enabled}            OPTIONAL,
-- Need S
    pdcch-DMRS-ScramblingID        INTEGER (0..65535)             OPTIONAL,
-- Need
    ...,
    [[
    rb-Offset-r16           INTEGER (0..5)                 OPTIONAL, --
Need S
    tci-PresentDCI-1-2-r16      INTEGER (1..3)                 OPTIONAL,
-- Need S
    coresetPoolIndex-r16        INTEGER (0..1)                 OPTIONAL,
-- Need S
    controlResourceSetId-v1610                      ControlResourceSetId-v1610
OPTIONAL -- Need S
    ]]
}
-- TAG-CONTROLRESOURCESET-STOP
-- ASN1STOP
```

Referring to [Table 11], duration, which is a parameter of the CORESET configuration, is composed of {1 . . . maxCoReSetDuration}, and maxCoReSetDuration is fixed to 3 in the current standard. If maxCoReSetDuration is set to 6, a CORESET of up to 6 symbols may be configured. In addition, since the number of symbols of the CORESET may be configured in duration according to maxCoReSet-Duration, a CORESET duration exceeding 3 symbols may be configured.

However, there may be cases in which it is not desirable to consecutively configure a CORESET of up to 6 symbols in time or in symbols. For example, when the CORESET is excessively allocated to consecutive symbols, signals (e.g., an SSB and a common reference signal (CRS)) that should be necessarily transmitted and received in a corresponding duration may not be transmitted/received or may not be allocated. In addition, if the CORESET is allocated in 6 symbols in one slot, a PDSCH/PUSCH should be scheduled according to the remaining 8 symbols, and time that may be used for signals other than the CORESET in one slot decreases, which may be inefficient in resource utilization.

Therefore, in order to prevent the CORESET of up to 6 symbols from being continuous in time or symbols, a new parameter may be added to a ControlResourceSet configuration, which is a parameter for the CORESET, or an existing parameter may be changed. For example, a plurality of integers may be configured for duration in order to configure non-consecutive CORESET symbols. In this case, each integer may mean the number of consecutive CORESET symbols in time. For example, if duration is set to {1, 2, 3}, the corresponding CORESET may be configured with 1 symbol, 2 consecutive symbols, and 3 consecutive symbols having a predetermined symbol gap. To this end, symbolGap, which is a new parameter for configuring a symbol gap, may be defined. symbolGap may be configured as an integer smaller by one than the number of integers configured for duration. Therefore, if duration is set to {1, 2, 3} as described above, symbolGap may be configured as two integers such as symbolGap={2, 2}.

FIG. 12 illustrates an exemplary CORESET configured as described above. Referring to FIG. 12, one CORESET may be configured in the form of 1-symbol CORESET/2-symbol gap/2-symbol CORESET/2-symbol gap/3-symbol CORESET in one slot according to the above-described configuration. That is, symbol #1, symbols #4 and #5, and symbols #8 to #10 may be configured as one CORESET. Accordingly, one CORESET is composed of 10 symbols including internal symbol gaps, and orthogonal frequency division multiplexing (OFDM) symbols in which the CORESET may actually be disposed may be 6 symbols.

Meanwhile, the CORESET including the symbol gap according to [Method 2-1] may be disposed according to [Method 2-3] to be described later. In other words, a lower CORESET of [Method 2-3] may be mapped to consecutive CORESET symbols for constituting one CORESET described in [Method 2-1].

There may be examples of various combinations to support AL 16 within a BW of 5 MHz. For example, the CORESET may be configured as 96 REGs (=24 RBs*4 symbols). 96 REGs is equal to the number of REGs required for AL 16. Accordingly, one CORESET may be mapped to one PDCCH candidate.

Alternatively, the CORESET may be configured as 144 REGs (=24 RBs*6 symbols). In this case, one PDCCH candidate utilizing AL 16 (96 REGs are required) and one PDCCH candidate of AL 8 (48 REGs are required) may be configured in one CORESET. However, the present disclosure is not limited thereto. Since the UE may utilize a control channel resource of up to 144 REGs, the PDCCH candidate may be mapped using various AL configurations. For example, two PDCCH candidates of AL 8 and two PDCCH candidates of AL 4 may be configured for one CORESET. Alternatively, one PDCCH candidate of AL 16 and two PDCCH candidates of AL 4 may be configured for one CORESET.

When [Method 2-1] is applied, an AL exceeding AL 16 may be introduced to compensate for coverage degradation of the RedCap UE due to RedCap. As an example, if AL 24 is introduced, 144 REGs (=24 CCEs*6 REGs/CCE) may be used for one PDCCH candidate, which may be great gain in preserving the reception performance of the UE.

[Method 2-2] Method of Configuring One Upper CORESET Using Lower CORESETs

In order to support ALs exceeding 75 REGs, which are the control channel resource of the Rel-18 RedCap UE, a method of configuring one large CORESET by combining a plurality of CORESETs is proposed. That is, a method of configuring one upper CORESET by combining a plurality of lower CORESETs is proposed.

For example, lower CORESETs and an upper CORESET configured as follows may be considered.

1) A sub-CORESET may be defined, and the sub-CORESET may be defined as a lower CORESET, a CORESET may be defined as an upper CORESET, and one CORESET may be defined by combining a plurality of sub-CORESETs.

2) A CORESET may be defined as a lower CORESET, a super-CORESET may be defined as an upper CORESET, and one super-CORESET may be defined by combining a plurality of CORESETs.

A description of a sub-CORESET which is defined and configured as a lower CORESET as in 1) will now be described first. The sub-CORESET may have a configuration similar to a CORESET in the existing NR standard. That is, duration, CCE-to-REG mapping, precoder granularity, etc. of the CORESET may remain the same as a configuration of the existing NR standard, or only some thereof may be changed.

To this end, controlResourceSetId of an information element SearchSpace may be configured with a plurality of IDs. That is, if a plurality of IDs is configured in a corresponding RRC parameter, the UE may recognize that a plurality of sub-CORESETs is configured in one SS set and a plurality of sub-CORESETs is combined to constitute one CORESET. Since a plurality of sub-CORESETs is combined to constitute one CORESET, there may be no change in a limit to a maximum of 4 CORESETs configured per BWP for the UE. For example, sub-CORESETs are not counted in the number of CORESETs configurable per BWP and only one CORESET configured by combining a plurality of sub-CORESETs may be fully counted. For example, when two sub-CORESETs are combined in the BWP to constitute one CORESET and three different CORESETs are configured, the total number of CORESETs in the BWP may be four.

On the other hand, a super-CORESET may be defined and configured as an upper CORESET as in 2). In this case, the super-CORESET may be defined while maintaining a normal CORESET configuration. Since the super-CORESET is determined by a combination of CORESETs, the super-CORESET may be configured by configuring a plurality of CORESET IDs. In this case, the super-CORESET may be defined by configuring a plurality of IDs in controlResource-SetId of the information element SearchSpace without an independent configuration. CORESETs that are not combined as the super-CORESET may be recognized as upper CORESETs in a BWP. For example, since one super-CORESET may replace the number of CORESETs that may be configured in the BWP and a CORESET may be configured as a lower CORESET, the total number of CORESETs configurable in the BWP may exceed 4. However, even in this case, the number of super-CORESETs configurable in the BWP (e.g., a super-CORESET, and CORESETs that are not configured as the super-CORESET) may be a maximum of 4. For example, when 6 CORESETs of CORESET #1 to CORESET #6 are configured in one BWP, if CORESET #1 to CORESET #3 are combined to constitute one super-CORESET, and each of CORESET #4 to CORESET #6 constitute one CORESET, then one super-CORESET and three CORESETs of CORESET #4 to CORESET #6, i.e., a total of 4 CORESETs, may be configured and defined as upper CORESETs configurable in the BWP.

Meanwhile, combining two or more lower CORESETs to form one upper CORESET may be implemented using various methods. For example, a plurality of lower CORESETs may be allocated in the time domain.

In this case, a plurality of lower CORESETs may be allocated in the time domain without modifying a limit to 5 MHz of up to 25 RBs and a CORESET duration configuration of up to 3 symbols in the existing NR standard. For example, an upper CORESET may be configured by a combination of a lower CORESET X of 24 RBs*1 symbol and a lower CORESET Y of 24 RBs*3 symbols. Alternatively, an upper CORESET may be configured by a combination of a lower CORESET X of 24 RBs*2 symbols and a lower CORESET Y of 24 RBs*2 symbols. Alternatively, one upper CORESET may be configured by two lower CORESETs of 16 RBs*3 symbols.

As another example, a plurality of lower CORESETs may be disposed in the frequency domain. In this case, if the UE supports [Method 2-1], 16 or more ALs may be equally supported. An upper CORESET of 24 RBs*4 symbols may be configured by combining a lower CORESET X of 8 RBs*4 symbols and a lower CORESET Y of 16 RBs*4 symbols.

Meanwhile, the above-described combination of lower CORESETs may also be utilized to support various ALs. For example, AL 24 as well as AL 16 may be supported by combining two lower CORESETs. For instance, AL 24 may be supported by combining two lower CORESETs of 24 RBs*3 symbols (=72 REGs). In the above examples, although the case of combining two lower CORESETs is considered, it is obvious that all cases of configuring one upper CORESET by combining more than two lower CORESETs may be considered.

In addition, lower CORESETs that may constitute an upper CORESET may be composed of consecutive symbols or may have a time/symbol gap therebetween. In other words, lower CORESETs that are not temporally consecutive may constitute one upper CORESET. This may be similar to the method described in [Method 2-1] above. For example, as illustrated in FIG. 12, lower CORESET #1 may be assigned to symbol #1, lower CORESET #2 may be assigned to symbols #4 and #5, and lower CORESET #3 may be assigned to symbols #8 to #10. In addition, lower CORESETs #1 to #3 may be combined to constitute one upper CORESET. That is, the upper CORESET may be disposed including two 2-symbol gaps.

[Method 2-3] Method of Arranging and Configuring Lower CORESETs

The lower CORESETs proposed in [Method 2-2] may be arranged using various methods. For this purpose, [Method 2-3] proposes a method of arranging and configuring a plurality of lower CORESETs in the time domain.

(1) Arrangement of Lower CORESETs in One Slot

The case in which lower CORESETs are consecutively arranged without a symbol gap may be considered. In this case, a CORESET configuration is individually configured for each of the lower CORESETs. However, as in [Method 2-1], the lower CORESETS may have a form similar to the case in which one CORESET having a duration of 4 symbols or more is configured. That is, if specific parameters such as cce-REG-MappingType, precoderGranularity, and pdcch-DMRS-ScramblingID of the lower CORESETs are equally configured, the lower CORESETs may be regarded as the same as one CORESET configured by a duration of 4 symbols or more. For example, the same effect as extension of a CORESET duration may be expected by configuring only a plurality of CORESET IDs in one SS set configuration.

Alternatively, a predetermined symbol gap may be configured between lower CORESETs. The symbol gap may be utilized to dispose resource elements (REs) and symbols of signals that should be transmitted more preferentially in a corresponding slot of a corresponding BWP. For example, a CRS symbol and an SSB of LTE may be transmitted and received through the symbol gap, and a symbol gap of 1 symbol or 4 symbols may be configured between lower CORESETs through transmission and reception of the above-described signals.

Meanwhile, the positions of the lower CORESETs may be configured through an SS set configuration. As described above, a CORESET index may be configured in the information element SearchSpace. In this case, a plurality of corresponding CORESET indexes may be configured, and a plurality of lower CORESETs may be configured in one SS set as in [Method 2-2].

Elements for configuring the positions of CORESETs and an SS set monitoring periodicity in the information element SearchSpace are described in 3GPP TS 38.331 as in [Table 12] and [Table 13].

TABLE 12

```
SearchSpace ::=              SEQUENCE {
   searchSpaceId                SearchSpaceId,
   controlResourceSetId         ControlResourceSetId        OPTIONAL,
   -- Cond SetupOnly
   monitoringSlotPeriodicity AndOffset   CHOICE {
      sl1                       NULL,
      sl2                       INTEGER (0..1),
      sl4                       INTEGER (0..3),
      sl5                       INTEGER (0..4),
      sl8                       INTEGER (0..7),
      sl10                      INTEGER (0..9),
      sl16                      INTEGER (0..15),
      sl20                      INTEGER (0..19),
      sl40                      INTEGER (0..39),
      sl80                      INTEGER (0..79),
      sl160                     INTEGER (0..159),
      sl320                     INTEGER (0..319),
      sl640                     INTEGER (0..639),
      sl1280                    INTEGER (0..1279),
      sl2560                    INTEGER (0..2559)
   }                                                        OPTIONAL, -- Cond
Setup
   duration                     INTEGER (2..2559)           OPTIONAL,
   -- Need R
   monitoringSymbolsWithinSlot                              BIT STRING (SIZE (14))
OPTIONAL, -- Cond Setup
   nrofCandidates               SEQUENCE {
      aggregationLevel1            ENUMERATED {n0, n1, n2, n3, n4, n5, n6, n8},
      aggregationLevel2            ENUMERATED {n0, n1, n2, n3, n4, n5, n6, n8},
      aggregationLevel4            ENUMERATED {n0, n1, n2, n3, n4, n5, n6, n8},
      aggregationLevel8            ENUMERATED {n0, n1, n2, n3, n4, n5, n6, n8},
      aggregationLevel16           ENUMERATED {n0, n1, n2, n3, n4, n5, n6, n8}
   }
   ...
```

TABLE 13

SearchSpace field descriptions controlResourceSetId

The CORESET applicable for this SearchSpace. Value 0 identifies the common
CORESET#0 configured in MIB and in ServingCellConfigCommon. Values
1..maxNrofControlResourceSets-1 identify CORESETs configured in System Information
or by dedicated signalling. The CORESETs with non-zero controlResourceSetId are
configured in the same BWP as this SearchSpace. If the field controlResourceSetId-r16 is
present, UE shall ignore the controlResourceSetId (without suffix).

duration

Number of consecutive slots that a SearchSpace lasts in every occasion, i.e., upon every
period as given in the periodicityAndOffset. If the field is absent, the UE applies the value
1 slot, except for DCI format 2_0. The UE ignores this field for DCI format 2_0. The
maximum valid duration is periodicity-1 (periodicity as given in the
monitoringSlotPeriodicityAndOffset).
For IAB-MT, duration indicates number of consecutive slots that a SearchSpace lasts in
every occasion, i.e., upon every period as given in the periodicity AndOffset. If the field is
absent, the IAB-MT applies the value 1 slot, except for DCI format 2_0 and DCI format
2_5. The IAB-MT ignores this field for DCI format 2_0 and DCI format 2_5. The
maximum valid duration is periodicity-1 (periodicity as given in the
monitoringSlotPeriodicity AndOffset).

monitoringSlotPeriodicity AndOffset

Slots for PDCCH Monitoring configured as periodicity and offset. If the UE is configured
to monitor DCI format 2_1, only the values 'sl1', 'sl2' or 'sl4' are applicable. If the UE is
configured to monitor DCI format 2_0, only the
values 'sl1', 'sl2', 'sl4', 'sl5', 'sl8', 'sl10', 'sl16', and 'sl20' are applicable (see TS 38.213 [13],
clause 10). If the UE is configured to monitor DCI format 2_4, only the values 'sl1', 'sl2',
'sl4', 'sl5', 'sl8' and 'sl10' are applicable.
For IAB-MT, If the IAB-MT is configured to monitor DCI format 2_1, only the values
'sl1', 'sl2' or 'sl4' are applicable. If the IAB-MT is configured to monitor DCI format 2_0 or
DCI format 2_5, only the values 'sl1', 'sl2', 'sl4', 'sl5', 'sl8', 'sl10', 'sl16', and 'sl20' are
applicable (see TS 38.213, clause 10).

monitoringSymbols WithinSlot

The first symbol(s) for PDCCH monitoring in the slots configured for PDCCH monitoring
(see monitoringSlotPeriodicityAndOffset and duration). The most significant (left) bit
represents the first OFDM in a slot, and the second most significant (left) bit represents the
second OFDM symbol in a slot and so on. The bit(s) set to one identify the first OFDM
symbol(s) of the control resource set within a slot. If the cyclic prefix of the BWP is set to
extended CP, the last two bits within the bit string shall be ignored by the UE or IAB-MT.
For DCI format 2_0, the first one symbol applies if the duration of CORESET (in the IE
ControlResourceSet) identified by controlResourceSetId indicates 3 symbols, the first two
symbols apply if the duration of CORESET identified by controlResourceSetId indicates 2
symbols, and the first three symbols apply if the duration of CORESET identified by
controlResourceSetId indicates 1 symbol.
See TS 38.213 [13], clause 10.

For IAB-MT: For DCI format 2_0 or DCI format 2_5, the first one symbol applies if the
duration of CORESET (in the IE ControlResourceSet) identified by controlResourceSetId
indicates 3 symbols, the first two symbols apply if the duration of CORESET identified by
controlResourceSetId indicates 2 symbols, and the first three symbols apply if the duration
of CORESET identified by controlResourceSetId indicates 1 symbol.
See TS 38.213 [13], clause 10.

Referring to [Table 12] and [Table 13], monitoringSlotPeriodicityAndOffset serves to configure a monitoring slot periodicity of an SS set and an offset for monitoring the SS set, and duration indicates how long slot duration the number of slots to which a monitoring occasion (MO) is allocated persists. Since monitoringSlotPeriodicityAndOffset and duration described above do not need to be separately configured for a plurality of lower CORESETs, there is no need to deviate from the existing NR standard.

However, monitoringSymbolsWithinSlot for configuring a plurality of lower CORESETs may be configured for each lower CORESET. monitoringSymbolsWithinSlot serves to indicate a PDCCH monitoring pattern within a slot and represents from which symbol in an MO-configured slot a CORESET is arranged through monitoringSlotPeriodicityAndOffset and duration.

Accordingly, a plurality of monitoringSymbolsWithinSlot corresponding to a plurality of lower CORESETs may be configured. For example, if two lower CORESETs are configured with controlResourceSetId={1, 2}, monitoringSymbolsWithinSlot-lower1 and monitoringSymbolsWithinSlot-lower2 may be configured. Alternatively, monitoringSymbolsWithinSlot such as monitoringSymbolsWithinSlot={BIT STRING (SIZE (14)), BIT STRING (SIZE (14))} may be configured as a pair. In both cases described above, the same number of CORESETs as the maximum number of combinable lower CORESETs may be configured, and values corresponding to lower CORESETs of an order that are not actually combined may be ignored. The order of lower CORESETs may follow an order configured in controlResourceSetId. For example, if controlResourceSetId={4, 1} is configured, a lower CORESET having a CORESET index of 4 may correspond to the first monitoringSymbolsWithinSlot value, and a lower CORESET having a CORESET index of 1 may correspond to the second monitoringSymbolsWithinSlot value. Alternatively, the order of the lower CORESETs may be determined in ascending or descending order of CORESET indexes regardless of the order.

As another example, when monitoringSymbolsWithinSlot is configured through one parameter, the order of lower CORESETS may follow a predefined rule or may be configured by a rule indicated by the BS. For example, a plurality of lower CORESETs may be sequentially disposed without a symbol gap. In this case, the order of the arranged lower CORESETs may be determined in ascending order or descending order according to an order configured in CORESET indexes or controlResourceSetId.

Alternatively, the symbol gap may be configured through a separate parameter while following the above rule. The BS may allow the positions of lower CORESETs to be determined by avoiding an LTE CRS symbol or a symbol to which the SSB is allocated through a parameter (e.g., symbolGapBetween-lowerCORESET) that configures the symbol gap.

For example, when starting symbols of two SSBs in a BWP is the third symbol and the ninth symbol, three 2-symbol lower CORESETs constituting one upper CORESET may be disposed by avoiding the symbols to which the two SSBs are allocated. For example, the starting symbols of the three 2-symbol lower CORESETs may be the 1st symbol, the 7th symbol, and the 13th symbol and may be configured according to the following example.

1) monitoringSymbolsWithinSlot={10000000000000, 00000010000000, 00000000000010}
2) monitoringSymbolsWithinSlot-lower1={10000000000000}, monitoringSymbolsWithinSlot-lower2={00000010000000}, monitoringSymbolsWithinSlot-lower3={00000000000010}
3) monitoringSymbolsWithinSlot={0000000000000}, symbolGapBetween-lowerCORESET=4

Even if any of methods 1), 2), and 3) described above is used, the starting symbols of the three lower CORESETs may be equally disposed in the 1st symbol, the 7th symbol, and the 13th symbol, respectively.

(2) Arrangement of Lower CORESETs in Different Slots

A plurality of lower CORESETs may be arranged in different slots. In other words, lower CORESETs located in different slots may be combined to constitute one upper CORESET. First, a method of determining a plurality of lower CORESETs as relative positions to the first lower CORESET may be considered. The position of the first lower CORESET may be determined through monitoringSymbolsWithinSlot, and the positions of the second and subsequent lower CORESETs may be determined by a configured symbol gap. For example, if the symbol gap is 0, lower CORESETs may be consecutively arranged without a symbol gap therebetween.

FIG. 13A illustrates that three 2-symbol lower CORESETs constitute one upper CORESET, the first lower CORESET is located in the 12th symbol and the 13th symbol of a front slot, and a symbol gap is one symbol. In FIG. 13A, numbers at the top indicate symbol numbers, and dotted lines indicate a division between slots. The first lower CORESET is located in the 12th and 13th symbols of the front slot, the second lower CORESET is located in the first and second symbols of a rear slot, and the third lower CORESET is located in the fourth and fifth symbols of the rear slot. If FIG. 13A is configured according to 3) of method (1), monitoringSymbolsWithinSlot={00000000000100}, symbolGapBetween-lowerCORESET=1.

In order to express the example of FIG. 13A, configurations 1) and 2) of method (1) may also be used. In case of configuration 1), monitoringSymbolsWithinSlot={00000000000100, 10000000000000, 00010000000000}. In this case, respective elements are associated with the first lower CORESET, the second lower CORESET, and the third lower CORESET, and the order of the lower CORESETs may be determined by the configuration order of controlResourceSetId or the ascending/descending order of the CORESET indexes as described above.

If FIG. 13A is represented as the configuration of 2) of method (1), monitoringSymbolsWithinSlot-lower1={00000000000100}, monitoringSymbolsWithinSlot-lower2={10000000000000}, monitoringSymbolsWithinSlot-lower3={00010000000000}.

In all three cases, the relative positions of the remaining lower CORESETs may be determined based on the first lower CORESET, and constraint that all lower CORESETs should be located in the same slot may be removed.

In this case, the UE may consider monitoringSlotPeriodicityAndOffset and duration of an SS set based on the first lower CORESET. That is, a monitoring periodicity and a starting point of the duration are started from a slot in which the first lower CORESET is located, and a reference point of the offset may be the first symbol of the corresponding slot. When the lower CORESETs are located in a plurality of slots, the UE may expect that lower CORESETs outside the duration of the SS set will not be configured. If lower CORESETs outside the duration of the SS set are configured, monitoring for an upper CORESET configured by combining lower CORESETs that are not included in duration may not be performed. For example, referring to FIG. 13B, lower CORESET #1 and lower CORESET #2 are located in different slots to constitute one upper CORESET in an SS set with a periodicity of 4 slots and a duration of 3 slots.

Since duration is 3 slots, slots #1, #2, and #3 are slots to be monitored by the UE. Therefore, since lower CORESET #2 located in slot #4 is not an MO, the UE does not monitor lower CORESET #1 of slot #3 connected thereto. Therefore, in the case of FIG. 13B, it may be more desirable to configure duration to 2 or 4 slots in a periodicity of 4 slots.

On the other hand, when lower CORESETs are configured over a plurality of slots, blind decoding (BD)/CCE limit for monitoring the lower CORESETs may be problematic. In the case of the Rel-15 NR standard, the BD/CCE limit, which means BD of the UE and the number of non-overlapped CCEs monitored, is represented in units of one slot. Accordingly, when lower CORESETs are located over a plurality of slots, slots for applying the BD/CCE limit need to be determined.

Since the UE needs to perform BD based on one upper CORESET by monitoring a plurality of lower CORESETs, it is necessary to perform buffering on all lower CORESETs. Therefore, the BD/CCE limit may be applied based on the position of the last lower CORESET. Even when the BD/CCE limit in span units rather than one slot is applied, the BD/CCE limit may be equally applied based on a span including the last lower CORESET. In addition, if the BD/CCE limit is in units of multiple slots, the UE may expect that lower CORESETs are equally located in units of multiple slots, and the BD/CCE limit may be applied in units of multiple slots. If the BD/CCE limit is not in units of multiple slots, the BD/CCE limit may be applied based on the unit of a slot in which the last lower CORESET is located.

(3) Consecutive Arrangement of CORESET Symbols by Avoiding Invalid Symbols

A method may be considered of maintaining monitoringSymbolsWithinSlot by indicating only a starting symbol of CORESETs as in the existing NR standard and preferentially arranging, in a symbol, signals that should be transmitted more preferentially in a corresponding slot of a corresponding BWP when mapping the CORESETs. Here, the signals that should be transmitted preferentially may be a CRS symbol and an SSB of LTE.

A symbol to which a signal to be prioritized is assigned is regarded as an invalid symbol, and lower CORESETs may be consecutively assigned to the remaining valid symbols (i.e., symbols that are not invalid symbols).

In other words, other signals have already been assigned preferentially to invalid symbols, and lower CORESETs may be automatically arranged with a symbol gap corresponding to the number of invalid symbols. In this case, information through which the positions of the invalid symbols for the SSB that should be transmitted preferentially may be based on an MIB or SIB1. In addition, information about the position of the CRS symbol of LTE may be based on ServingCellConfig information (e.g., lte-CRS-ToMatchAround).

For example, referring to FIG. 12, it is assumed that a 6-symbol CORESET is configured as in [Method 2-1], or 1-symbol lower CORESET #1, 2-symbol lower CORESET #2, and 3-symbol lower CORESET #3 are configured as in [Method 2-2]. If the UE recognizes that a CRS is transmitted in symbols #2 and #3 and symbols #6 and #7 based on ServingCellConfig information, the UE may automatically determine that lower CORESET #1 is allocated to symbol #1, CORESET #2 is allocated to symbols #4 and #5, and CORESET #3 is allocated to symbols #8, #9, and #10.

TABLE 14

| Index | O | Number of search space sets per slot | M | First symbol index |
| --- | --- | --- | --- | --- |
| 0 | 0 | 1 | 1 | 0 |
| 1 | 0 | 2 | 1/2 | {0, if i is even}, {NsymbCORESET, if i is odd} |
| 2 | 2 | 1 | 1 | 0 |
| 3 | 2 | 2 | 1/2 | {0, if i is even}, {NsymbCORESET, if i is odd} |
| 4 | 5 | 1 | 1 | 0 |
| 5 | 5 | 2 | 1/2 | {0, if i is even}, {NsymbCORESET, if i is odd} |
| 6 | 7 | 1 | 1 | 0 |
| 7 | 7 | 2 | 1/2 | {0, if i is even}, {NsymbCORESET, if i is odd} |
| 8 | 0 | 1 | 2 | 0 |
| 9 | 5 | 1 | 2 | 0 |
| 10 | 0 | 1 | 1 | 1 |
| 11 | 0 | 1 | 1 | 2 |
| 12 | 2 | 1 | 1 | 1 |
| 13 | 2 | 1 | 1 | 2 |
| 14 | 5 | 1 | 1 | 1 |
| 15 | 5 | 1 | 1 | 2 |

[Table 14] shows an MO of CORESET #0 in FR1, described in 3GPP TS 38.213. When an SSB and CORESET #0 are multiplexing pattern 1, the UE monitors a Type0-PDCCH CSS set over 2 slots. In addition, when the index of the SSB is i, the UE may determine slot n0 to start monitoring as shown in [Table 15] below.

TABLE 15

$n_0 = (O \cdot 2^\mu + [i \cdot M]) \bmod N_{slot}^{frame,\mu}$ that is in a frame with system frame number (SFN) $SFN_C$ satisfying $SFN_c \bmod 2 = 0$ if $[(O \cdot 2^\mu + [i \cdot M])/N_{slot}^{frame,\mu}] \bmod 2 = 0$, or in a frame with SFN satisfying $SFN_c \bmod 2 = 1$ if $[(O \cdot 2^\mu + [i \cdot M])/N_{slot}^{frame,\mu}] \bmod 2 = 1$ On the other hand, it may be useful that arrangement of the lower CORESETs according to (3) is applied when a separate symbol gap is not configured. If the upper CORESET includes a symbol gap, the symbol gap may also be regarded as a symbol of the CORESET and may not be located in the invalid gap (i.e., invalid symbol). In this case, there may be an interval corresponding to (symbol gap+invalid symbol) between actual lower CORESETs. Alternatively, the symbol gap may be configured to be located in the invalid gap (i.e., invalid symbol). In this case, there may be an interval corresponding to a MAX (the symbol gap, invalid symbol) between actual lower CORESETs.

[Method 2-4] Method of Configuring a CORESET for Type0-PDCCH CSS Set

An SS set and a CORESET configuration that are configurable for the UE after an RRC connected state may be provided based on at least one of [Method 2-1] to [Method 2-3] described above.

However, a CORESET for a Type0-PDCCH CSS set (hereinafter, CORESET #0) that the UE may utilize in random access (or initial access) before RRC connection may require a separate configuration. As shown in [Table 10], CORESET #0 may be configured based on a multiplexing pattern with an SSB, the number of RBs, the number of symbols, and an offset. Meanwhile, parameters of an MO for CORESET #0 are shown in [Table 14] below.

In order to configure CORESET #0 for applying [Method 2-1] to [Method 2-3], the number of lower CORESETs, the frequency range of each lower CORESET, the number of symbols of each lower CORESET, a symbol gap between lower CORESETs, and a position of each lower CORESET in the time domain may need to be determined.

Since the Rel-18 RedCap UE has a limit to a BW of 5 MHz, a multiplexing pattern and the number of RBs for the lower CORESET may be fixed to multiplexing pattern 1 and 24 RBs, respectively.

The symbol of lower CORESETs may be 1, 2, or 3. Since CORESET #0 does not represent a position using a bit string like a CORESET configuration after RRC connection, it may be desirable to indicate the positions of a plurality of lower CORESETs using a symbol gap. If the symbol gap is not configured, all lower CORESETs may be considered to be consecutive in the time domain.

Meanwhile, a PDCCH MO as shown in [Table 14] may be configured based on one upper CORESET obtained by combining a plurality of lower CORESETs. Therefore, in this case, the contents of the existing NR standard may be used without change.

In this case, assuming that a separate initial BWP for the Rel-18 RedCap UE may be considered, a table similar to [Table 10] may need to be separately configured. For example, items to be included in the table may be as follows.

Multiplexing pattern 1 of an SSB and a CORESET (this may be omitted as being always 1)

Number of RBs=24 (this may be omitted as being always 24 RBs)

The number of symbols of each sub-CORESET (if only one symbol is configured, lower CORESETs may all have the same number of symbols).

Offset (may be expressed as the number of RBs)

Symbol gap between lower CORESETs (this may follow one of the methods proposed in [Method 2-3])

Therethrough, one upper CORESET #0 exceeding 3 symbols may be configured, and Upper CORESET #0 may or may not have a symbol gap in the middle. In addition, CORESET #0 configured through the above-described method may be referred to as CORESET #0 for the RedCap UE.

Alternatively, CORESET #0 for RedCap exceeding 3 symbols may be configured using [Method 2-1]. In this case, if only the number of symbols is configured to exceed 3 in the configuration shown in [Table 10], it may be considered that separate CORESET #0 is configured for the RedCap UE.

According to [Method 2], a CORESET for control channel transmission may be efficiently configured even within a limited BW. That is, a CORESET that may support all of existing ALs may be configured even within a limited BW, thereby increasing flexibility in allocation of the control channel resource.

According to [Method 2-1] to [Method 2-3], more symbols of a CORESET than symbols of an existing CORESET may be allocated, so that all ALs may be supported, and a symbol gap may be allocated between CORESETs. Therefore, the efficiency of resource mapping may be increased while preventing collision with transmission of other signals.

According to [Method 2-4], the CORESET configuration method according to [Method 2-1] to [Method 2-3] may be utilized in a random access procedure prior to RRC connection.

The various details, functions, procedures, proposals, methods, and/or operational flowcharts described above in this document may be applied to a variety of fields that require wireless communication/connection (e.g., 5G) between devices.

Hereinafter, a description will be given in detail with reference to drawings. In the following drawings/descriptions, the same reference numerals may denote the same or corresponding hardware blocks, software blocks, or functional blocks unless specified otherwise.

Figure 14:
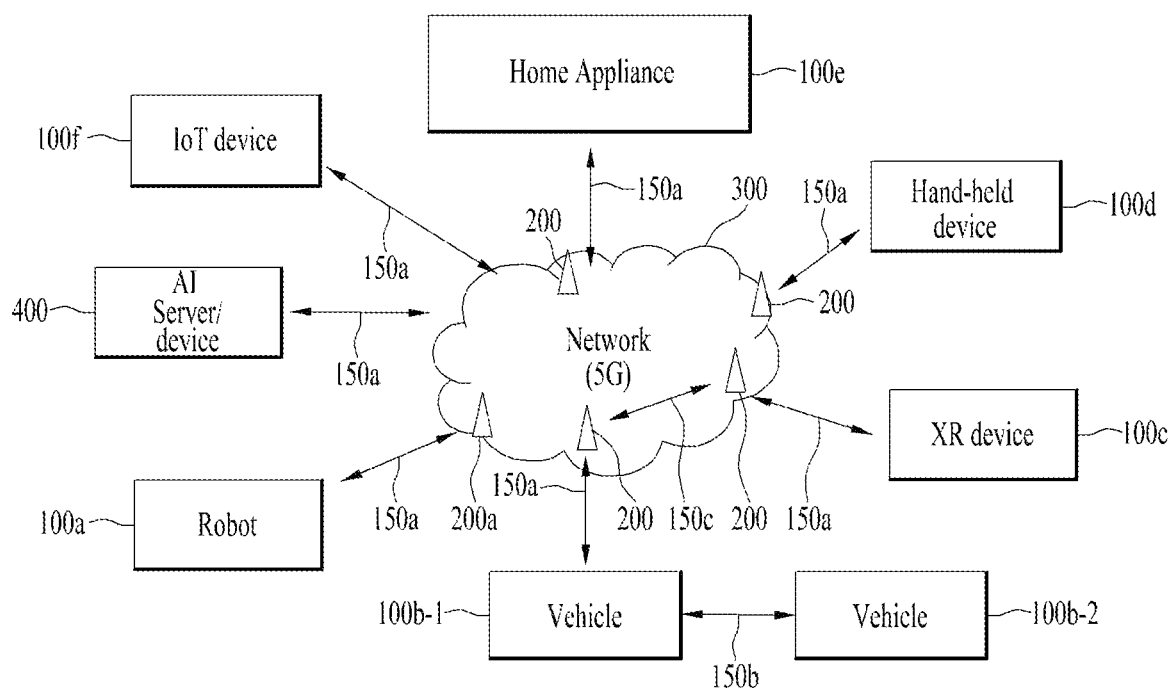
FIG. 14 illustrates an exemplary communication system applied to the present disclosure.

FIG. 14 illustrates a communication system 1 applied to the present disclosure.

Referring to FIG. 14, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 15:
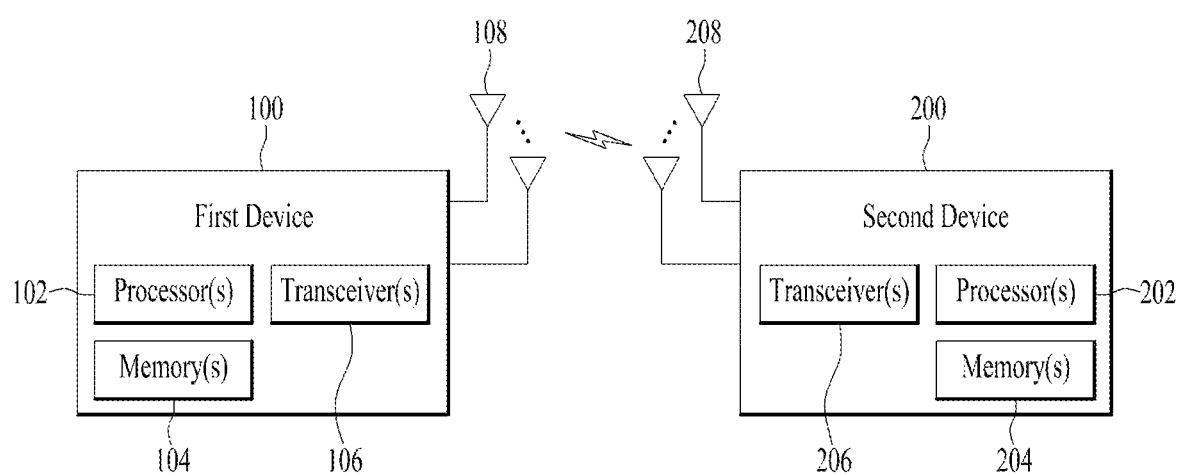
FIG. 15 illustrates an exemplary wireless device applicable to the present disclosure.

FIG. 15 illustrates wireless devices applicable to the present disclosure.

Referring to FIG. 15, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 14.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

Specifically, instructions and/or operations, controlled by the processor 102 of the first wireless device 100 and stored in the memory 104 of the first wireless device 100, according to an embodiment of the present disclosure will now be described.

Although the following operations will be described based on a control operation of the processor 102 in terms of the processor 102, software code for performing such an operation may be stored in the memory 104. For example, in the present disclosure, the at least one memory 104 may store instructions or programs as a computer-readable storage medium. The instructions or the programs may cause, when executed, at least one processor operably connected to the at least one memory to perform operations according to embodiments or implementations of the present disclosure, related to the following operations.

Specifically, the processor 102 may receive information related to a CORESET and/or a CORESET for an RedCap UE from a BS in an RRC connected state through the transceiver 106. The processor 102 may check whether a corresponding cell allows allocation of a separate control channel resource for the RedCap UE through the received information. For example, the received information may include information about whether to allow allocation of the separate control channel resource for the RedCap UE. If the received information includes information about the CORESET for the RedCap UE, the processor 102 may recognize that allocation of the separate control channel for the RedCap UE is allowed.

If allocation of the separate control channel resource for the RedCap UE is allowed by the corresponding cell, the processor 102 may receive a PDCCH based on the CORESET for the RedCap through the transceiver 106. If allocation of the separate control channel resource for the RedCap UE is not allowed by the corresponding cell, the processor 102 may receive, through the transceiver 106, the PDCCH based on a CORESET that all UEs may commonly use.

A detailed operation of the processor 102 according to the above description may be based on at least one of [Method 1] and [Method 2].

Before RRC connection, the processor 102 initiates random access. For example, the processor 102 may receive an SSB from the BS for random access through the transceiver 106. The processor 102 may also obtain an MIB from a PBCH of the SSB. The processor 102 may obtain information related to CORESET #0 and/or CORESET #0 for the RedCap UE from the corresponding MIB. Here, CORESET #0 may mean a CORESET for a Type-0 PDCCH CSS set for a normal UE. In addition, CORESET #0 for the RedCap UE may mean CORESET #0 for a separate Type-0 PDCCH CSS set for a UE with a limited BW (e.g., RedCap UE) as CORESET #0 configured according to the proposed methods of the present disclosure.

The processor 102 may check whether a corresponding cell allows allocation of a separate control channel resource for the RedCap UE through the obtained information. For example, the obtained information may include information about whether to allow allocation of the separate control channel resource for the RedCap UE. If the obtained information includes information about CORESET #0 for the RedCap UE, the processor 102 may recognize that allocation of the separate control channel for the RedCap UE is allowed.

If allocation of the separate control channel resource for the RedCap UE is allowed by the corresponding cell, the processor 102 may receive system information of the cell based on CORESET #0 for the RedCap UE through the transceiver 106. If allocation of the separate control channel resource for the RedCap UE is not allowed by the corresponding cell, the processor 102 may receive the system information of the cell based on CORESET #0 that all UEs may commonly use. For example, the processor 102 may receive, through the transceiver 106, a PDCCH that schedules SIB1 through CORESET #0 for the RedCap UE or CORESET #0. The processor 102 may receive SIB1 based on the PDCCH through the transceiver 106.

A detailed operation of the processor 102 according to the above description may be based on at least one of [Method 1] and [Method 2].

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Specifically, instructions and/or operations, controlled by the processor 202 of the second wireless device 200 and stored in the memory 204 of the second wireless device 200, according to an embodiment of the present disclosure will now be described.

Although the following operations will be described based on a control operation of the processor 202 in terms of the processor 202, software code for performing such an operation may be stored in the memory 204. For example, in the present disclosure, the at least one memory 204 may store instructions or programs as a computer-readable storage medium. The instructions or the programs may cause, when executed, at least one processor operably connected to the at least one memory to perform operations according to embodiments or implementations of the present disclosure, related to the following operations.

Specifically, in an RRC connected state, the processor 202 may determine whether a separate control channel resource for an RedCap UE is allocated. If a corresponding cell allows allocation of the separate control channel resource for the RedCap UE, the processor 202 may separately configure a CORESET and a CORESET for RedCap. If the corresponding cell does not allow allocation of the separate control channel resource for the RedCap UE, the processor 202 may configure a CORESET that all UEs may use in common. The processor 202 may transmit information including the configured CORESET and/or the configured CORESET for the RedCap UE to the UE through the transceiver 206. In addition, the processor 202 may transmit, through the transceiver 206, a PDCCH through the CORESET and/or the CORESET for the RedCap UE.

A detailed operation of the processor 202 according to the above description may be based on at least one of [Method 1] and [Method 2].

The processor 202 before an RRC connected state may configure system information (e.g., SIB1) of a cell. In this case, the processor 202 may determine whether the cell allocates a separate control channel resource for random access (or initial access) for an RedCap UE. If the cell allows allocation of the separate control channel resource for the RedCap UE, the processor 202 may separately configure CORESET #0 and CORESET #0 for RedCap. If the cell does not allow allocation of the separate control channel resource for the RedCap UE, the processor 202 configures CORESET #0 that all UEs may commonly use. The processor may transmit information including CORESET #0 and/or CORESET #0 for the RedCap UE to the UE through the transceiver 206. In addition, the processor 202 may transmit, through the transceiver 206, the PDCCH through CORESET #0 and/or CORESET #0 for the RedCap UE and transmit system information based on the PDCCH. For example, the system information may be SIB1, and the PDCCH may be for scheduling SIB1.

A detailed operation of the processor 202 according to the above description may be based on at least one of [Method 1] and [Method 2].

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 16:
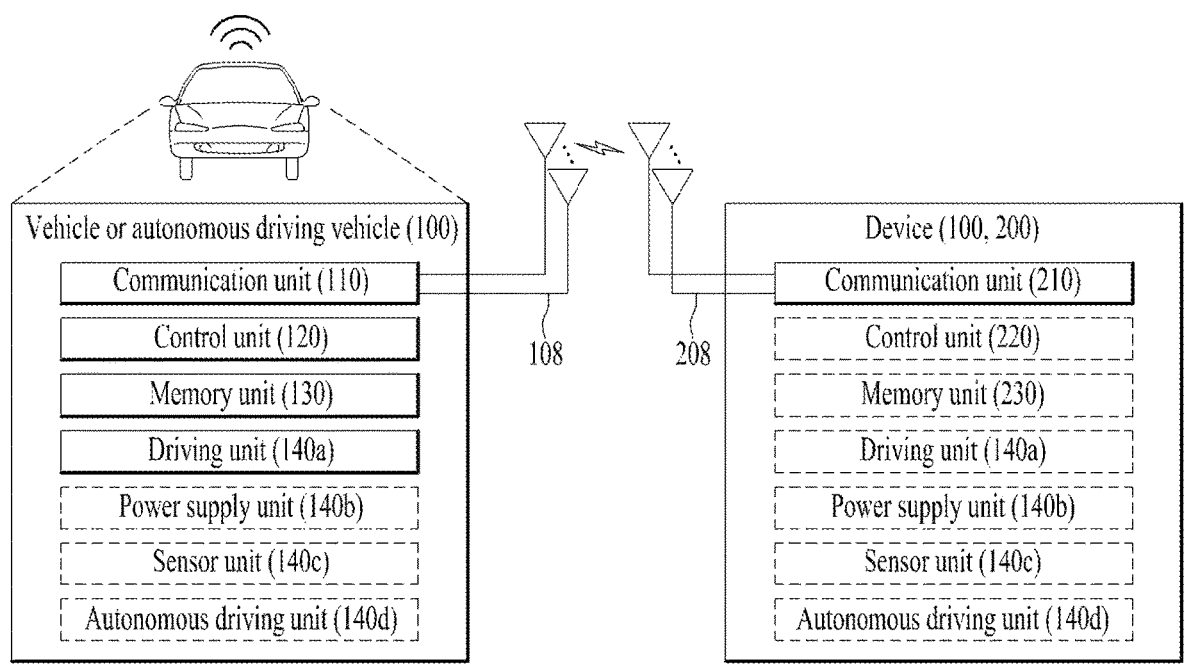
FIG. 16 illustrates an exemplary vehicle or autonomous driving vehicle applicable to the present disclosure.

FIG. 16 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 16, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the present disclosure, a specific operation described as performed by the BS may be performed by an upper node of the BS in some cases. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

While the above-described method of transmitting and receiving a DL control channel and the apparatus therefor have been described based on an example applied to a 5G NR system, the method and apparatus are applicable to various wireless communication systems in addition to the 5G NR system.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method of receiving a physical downlink control channel (PDCCH) by a user equipment (UE) in a wireless communication system, the method comprising:
   receiving, through a higher layer, (i) first information including a plurality of identifications (IDs) for a plurality of control resource sets (CORESETs) and (ii) second information related to resources of the plurality of CORESETs;
   determining an upper CORESET including the plurality of CORESETs based on the first information and the second information; and
   receiving the PDCCH through the upper CORESET,
   wherein each of the plurality of CORESETs is configured based on (i) a control channel element (CCE) supporting an aggregation level of 2n and (ii) N orthogonal frequency division multiplexing (OFDM) symbols, each of n and N being a positive integer and N being equal to or less than 3.

2. The method of claim 1, wherein a time gap including at least one OFDM symbol is present between the plurality of CORESETs.

3. The method of claim 1, wherein a maximum bandwidth available by the UE includes resource blocks (RBs) equal to or less than a predetermined number.

4. The method of claim 1, wherein the plurality of CORESETs are not mapped to invalid OFDM symbols, and the invalid OFDM symbols are used for a downlink signal other than the PDCCH.

5. The method of claim 4, wherein the downlink signal is a synchronization signal block (SSB) or a common reference signal (CRS).

6. The method of claim 1, wherein the number of OFDM symbols allocated for the upper CORESET exceeds 3.

7. A user equipment (UE) for receiving a physical downlink control channel (PDCCH) in a wireless communication system, the UE comprising:
   at least one transceiver;
   at least one processor; and
   at least one memory operably connected to the at least one processor and configured to store instructions causing, when executed, the at least one processor to perform operations comprising:
   receiving, through a higher layer, (i) first information including a plurality of identifications (IDs) for a plurality of control resource sets (CORESETs) and (ii) second information related to resources of the plurality of CORESETs, through the at least one transceiver;
   determining an upper CORESET including the plurality of CORESETs based on the first information and the second information; and
   receiving the PDCCH through the upper CORESET through the at least one transceiver, and
   wherein each of the plurality of CORESETs is configured based on (i) a control channel element (CCE) supporting an aggregation level of 2n and (ii) N orthogonal frequency division multiplexing (OFDM) symbols, each of n and N being a positive integer and N being equal to or less than 3.

8. The UE of claim 7, wherein a time gap including at least one OFDM symbol is present between the plurality of CORESETs.

9. The UE of claim 7, wherein a maximum bandwidth available by the UE includes resource blocks (RBs) equal to or less than a predetermined number.

10. The UE of claim 7, wherein the plurality of CORESETs are mapped to invalid OFDM symbols, and the invalid OFDM symbols are used for a downlink signal other than the PDCCH.

11. The UE of claim 10, wherein the downlink signal is a synchronization signal block (SSB) or a common reference signal (CRS).

12. The UE of claim 7, wherein the number of OFDM symbols allocated for the upper CORESET exceeds 3.

13. A base station (BS) for transmitting a physical downlink control channel (PDCCH) in a wireless communication system, the BS comprising:
   at least one transceiver;
   at least one processor; and
   at least one memory operably connected to the at least one processor and configured to store instructions causing, when executed, the at least one processor to perform operations comprising:
   transmitting, through a higher layer, (i) first information including a plurality of identifications (IDs) for a plurality of control resource sets (CORESETs) and (ii) second information related to resources of the plurality of CORESETs; and
   transmitting the PDCCH through an upper CORESET based on the first information and the second information through the at least one transceiver,
   wherein the upper CORESET includes the plurality of CORESETs, and
   wherein each of the plurality of CORESETs is configured based on (i) a control channel element (CCE) supporting an aggregation level of 2n and (ii) N orthogonal frequency division multiplexing (OFDM) symbols, each of n and N being a positive integer and N being equal to or less than 3.

* * * * *